US012737074B2

(12) United States Patent
Kim et al.

(10) Patent No.: US 12,737,074 B2
(45) Date of Patent: Sep. 15, 2026

(54) TOUCH INPUT DEVICE

(71) Applicant: HiDeep Inc., Seongnam-si (KR)

(72) Inventors: Bonkee Kim, Seongnam-si (KR); Seyeob Kim, Seongnam-si (KR)

(73) Assignee: HiDeep Inc. (KR)

( * ) Notice: Subject to any disclaimer, the term of this patent is extended or adjusted under 35 U.S.C. 154(b) by 26 days.

(21) Appl. No.: 18/634,082

(22) Filed: Apr. 12, 2024

(65) Prior Publication Data

US 2024/0345678 A1 Oct. 17, 2024

(30) Foreign Application Priority Data

Apr. 14, 2023 (KR) ........................ 10-2023-0049606

(51) Int. Cl.
*G06F 3/041* (2006.01)
*G06F 3/044* (2006.01)
*G09G 3/20* (2006.01)

(52) U.S. Cl.
CPC ........ *G06F 3/04166* (2019.05); *G06F 3/0446* (2019.05); *G06F 3/0412* (2013.01); *G09G 3/20* (2013.01); *G09G 2320/0247* (2013.01); *G09G 2354/00* (2013.01)

(58) Field of Classification Search
None
See application file for complete search history.

(56) References Cited

U.S. PATENT DOCUMENTS

2015/0193053 A1* 7/2015 Takagi .................. G06F 3/0445 345/174
2016/0370940 A1* 12/2016 Zhao .................. G06F 3/04166
2022/0155937 A1* 5/2022 Jo ........................ G06F 3/04184
2023/0152924 A1* 5/2023 Jeong ...................... G06F 3/044 345/174

FOREIGN PATENT DOCUMENTS

| | | | |
|---|---|---|---|
| JP | 2014186535 | A | 10/2014 |
| JP | 2014238881 | A | 12/2014 |
| KR | 20120076025 | A | 7/2012 |
| KR | 20220141964 | A | 10/2022 |
| KR | 102499519 | B1 | 2/2023 |

OTHER PUBLICATIONS

Korean Office Action 10-2023-0049606, Issued Jun. 14, 2024.

* cited by examiner

*Primary Examiner* — Krishna P Neupane
(74) *Attorney, Agent, or Firm* — The Belles Group, P.C.

(57) ABSTRACT

A touch input device preventing a flicker from occurring on a display screen caused by multi-driving of a touch sensor. The touch input device includes a display panel having a plurality of scan lines; a touch sensor including a plurality of driving electrodes arranged in the same direction as the scan line and a plurality of receiving electrodes arranged in a direction different from the scan line; and a control unit configured to perform a touch scan so that driving signals are applied to two or more driving electrodes of the plurality of driving electrodes. The control unit controls a driving timing of the touch scan so that the scan line to which a display scan signal is applied of the plurality of scan lines and the driving electrodes to which the driving signals are applied are not in overlap with each other in terms of time and space.

19 Claims, 20 Drawing Sheets

Touch Scan1 (Tx0~Tx3)

Touch Scan2 (Tx4~Tx7)

Touch Scan3 (Tx8~Tx11)

Touch Scan4 (Tx12~Tx15)

Touch Scan5 (Tx16~Tx19)

(a)

| | t1 | t2 | t3 | t4 |
|---|---|---|---|---|
| Tx0 | 1 | 1 | 1 | -1 |
| Tx1 | 1 | 1 | -1 | 1 |
| Tx2 | 1 | -1 | 1 | 1 |
| Tx3 | -1 | 1 | 1 | 1 |
| Sum | 2 | 2 | 2 | 2 |

Figure 6:
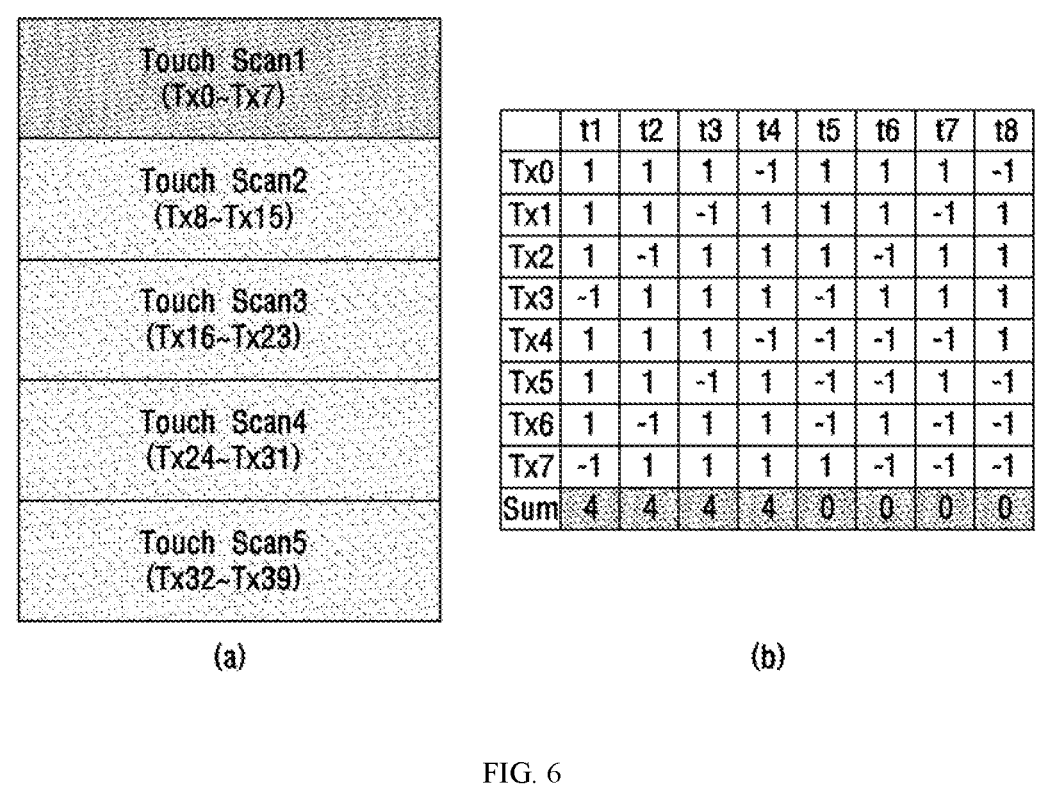

| Touch Scan1 (Tx0~Tx7) |
|---|
| Touch Scan2 (Tx8~Tx15) |
| Touch Scan3 (Tx16~Tx23) |
| Touch Scan4 (Tx24~Tx31) |
| Touch Scan5 (Tx32~Tx39) |

(a)

| | t1 | t2 | t3 | t4 | t5 | t6 | t7 | t8 |
|---|---|---|---|---|---|---|---|---|
| Tx0 | 1 | 1 | 1 | -1 | 1 | 1 | 1 | -1 |
| Tx1 | 1 | 1 | -1 | 1 | 1 | 1 | -1 | 1 |
| Tx2 | 1 | -1 | 1 | 1 | 1 | -1 | 1 | 1 |
| Tx3 | -1 | 1 | 1 | 1 | -1 | 1 | 1 | 1 |
| Tx4 | 1 | 1 | 1 | -1 | -1 | -1 | -1 | 1 |
| Tx5 | 1 | 1 | -1 | 1 | -1 | -1 | 1 | -1 |
| Tx6 | 1 | -1 | 1 | 1 | -1 | 1 | -1 | -1 |
| Tx7 | -1 | 1 | 1 | 1 | 1 | -1 | -1 | -1 |
| Sum | 4 | 4 | 4 | 4 | 0 | 0 | 0 | 0 |

Figure 13:
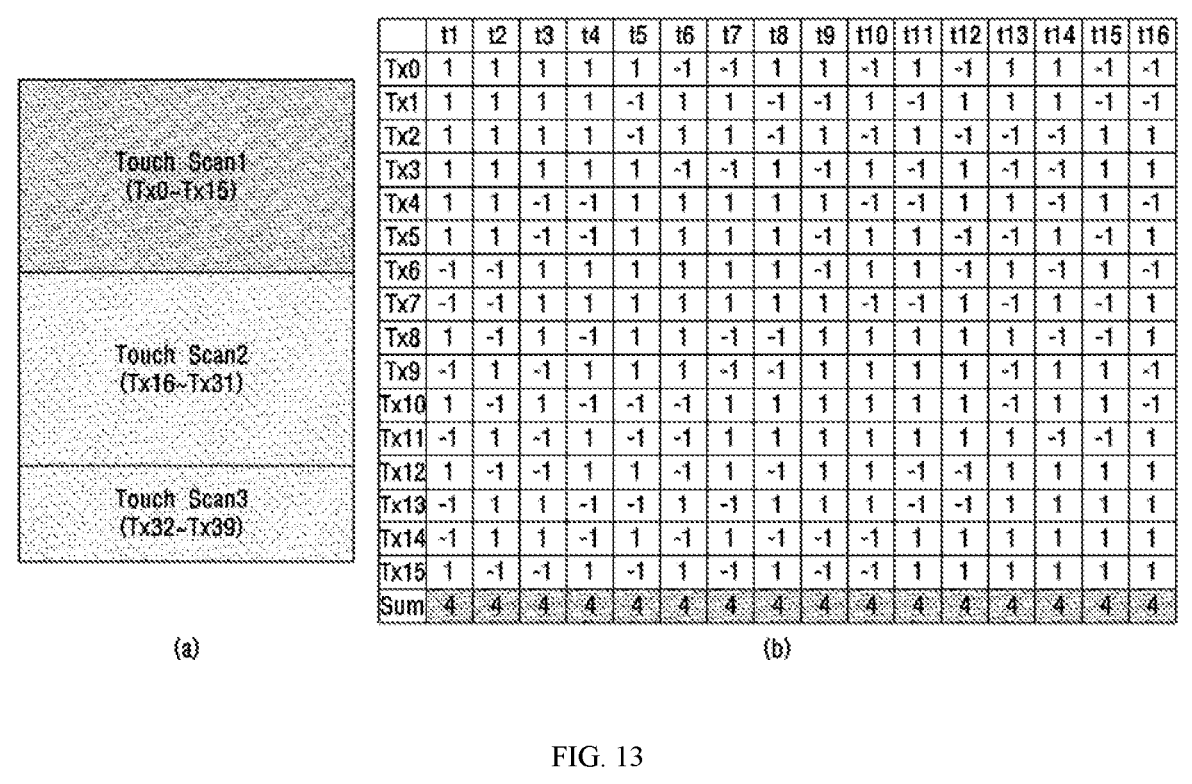

| Touch Scan1 (Tx0~Tx15) |
|---|
| Touch Scan2 (Tx16~Tx31) |
| Touch Scan3 (Tx32~Tx39) |

(a)

| | t1 | t2 | t3 | t4 | t5 | t6 | t7 | t8 | t9 | t10 | t11 | t12 | t13 | t14 | t15 | t16 |
|---|---|---|---|---|---|---|---|---|---|---|---|---|---|---|---|---|
| Tx0 | 1 | 1 | 1 | 1 | 1 | -1 | -1 | 1 | 1 | -1 | 1 | -1 | 1 | 1 | -1 | -1 |
| Tx1 | 1 | 1 | 1 | 1 | -1 | 1 | 1 | -1 | -1 | 1 | -1 | 1 | 1 | 1 | -1 | -1 |
| Tx2 | 1 | 1 | 1 | 1 | -1 | 1 | 1 | -1 | 1 | -1 | 1 | -1 | -1 | -1 | 1 | 1 |
| Tx3 | 1 | 1 | 1 | 1 | 1 | -1 | -1 | 1 | -1 | 1 | -1 | 1 | -1 | -1 | 1 | 1 |
| Tx4 | 1 | 1 | -1 | -1 | 1 | 1 | 1 | 1 | 1 | -1 | -1 | 1 | 1 | -1 | 1 | -1 |
| Tx5 | 1 | 1 | -1 | -1 | 1 | 1 | 1 | 1 | -1 | 1 | 1 | -1 | -1 | 1 | -1 | 1 |
| Tx6 | -1 | -1 | 1 | 1 | 1 | 1 | 1 | 1 | -1 | 1 | 1 | -1 | 1 | -1 | 1 | -1 |
| Tx7 | -1 | -1 | 1 | 1 | 1 | 1 | 1 | 1 | 1 | -1 | -1 | 1 | -1 | 1 | -1 | 1 |
| Tx8 | 1 | -1 | 1 | -1 | 1 | 1 | -1 | -1 | 1 | 1 | 1 | 1 | 1 | -1 | -1 | 1 |
| Tx9 | -1 | 1 | -1 | 1 | 1 | 1 | -1 | -1 | 1 | 1 | 1 | 1 | -1 | 1 | 1 | -1 |
| Tx10 | 1 | -1 | 1 | -1 | -1 | -1 | 1 | 1 | 1 | 1 | 1 | 1 | -1 | 1 | 1 | -1 |
| Tx11 | -1 | 1 | -1 | 1 | -1 | -1 | 1 | 1 | 1 | 1 | 1 | 1 | 1 | -1 | -1 | 1 |
| Tx12 | 1 | -1 | -1 | 1 | 1 | -1 | 1 | -1 | 1 | 1 | -1 | -1 | 1 | 1 | 1 | 1 |
| Tx13 | -1 | 1 | 1 | -1 | -1 | 1 | -1 | 1 | 1 | 1 | -1 | -1 | 1 | 1 | 1 | 1 |
| Tx14 | -1 | 1 | 1 | -1 | 1 | -1 | 1 | -1 | -1 | -1 | 1 | 1 | 1 | 1 | 1 | 1 |
| Tx15 | 1 | -1 | -1 | 1 | -1 | 1 | -1 | 1 | -1 | -1 | 1 | 1 | 1 | 1 | 1 | 1 |
| Sum | 4 | 4 | 4 | 4 | 4 | 4 | 4 | 4 | 4 | 4 | 4 | 4 | 4 | 4 | 4 | 4 |

TOUCH INPUT DEVICE

CROSS-REFERENCE TO RELATED APPLICATIONS

This U.S. non-provisional patent application claims priority under 35 U.S.C. § 119 of Korean Patent Application No. 10-2023-0049606, filed on Apr. 14, 2023, the entire contents of which are hereby incorporated by reference herein, for all purposes.

BACKGROUND

An embodiment of the present invention relates to a touch input device, and more particularly, to a touch input device capable of preventing a flicker from occurring on a display screen caused by multi-driving of a touch sensor.

Various kinds of input devices are used to operate a computing system. For example, the input devices include a button, a key, a joystick, and a touch screen. Since the touch screen is easily and simply operated, the touch screen is increasingly used when operating the computing system.

A touch sensor that is one kind of information input devices may be provided in a display panel. For example, the touch sensor may be attached to one surface of the display panel or integrated with the display panel. A user may input information by touching the touch sensor while seeing an image displayed on a screen of the display panel.

FIG. 1 is a schematic view illustrating a laminated structure of a typical OCTA method.

The OCTA that is one kind of touch screen panel technologies stands for On Cell Touch AMOLED and is one kind of touch screen panels (TSP) obtained by directly depositing the touch sensor on an AMOLED display cell as illustrated in FIG. 1. That is, the OCTA is a technology of applying a touch screen function of a smartphone/tablet into an OLED panel. Since no tempered glass is used between the cell and the touch sensor, clarity is improved compared with a typical general TSP.

Y-OCTA is a touch screen panel obtained by directly depositing the touch sensor on the cell. The Y-OCTA is named by adding Y of 'YOUM' that is a brand name of Samsung display flexible OLED to the 'OCTA'. The Y-OCTA technology is applied to a thin film encapsulation (TFE) process among OLED manufacturing processes. A touch screen is realized by patterning an aluminum metal mesh sensor used as a touch sensor between a polarizer and an organic material for thin film encapsulation. The Y-OCTA may solve a visibility limitation occurring at a curved edge by attaching the polarizer close to a cover window. Also, a thickness of the panel may be reduced by removing a support film, and costs may be reduced by omitting a laminating process.

A touch input device including a typical Y-OCTA touch screen panel has a limitation in a low ground mass (LGM) situation. The limitation is a phenomenon in which a signal that is normally detected by the touch input device is disappeared or detected at two or more points, when a predetermined touch occurs in a state (floating state) in which a user does not hold, by hands, the touch input device to which the touch sensor is mounted, in case of realizing a driving electrode and a receiving electrode of the touch sensor as a single layer or a double layer.

Also, the touch input device including the typical Y-OCTA touch screen panel has a flicker limitation on the display panel caused by driving of the touch sensor. Typically, in order to solve the flicker limitation, dithering is used for each frame, a driving voltage of the touch sensor is reduced, or frame rate information is received from a display driving chip (DDI) during a variable refresh rate (VRR) operation and a frequency of a driving signal of the touch sensor is changed based on the received frame rate information. However, the above-described trials have not completely solved the flicker limitation.

As a result, the touch input device including the typical Y-Octa touch screen panel still does not solve the flicker limitation and the problem of malfunction in the LGM situation.

SUMMARY

The present invention provides a touch input device capable of preventing a flicker from occurring on a display screen caused by a multi-driving of a touch sensor.

The present invention also provides a touch input device capable of decreasing a touch driving time to reduce power consumption.

The present invention also provides a touch input device capable of preventing a touch malfunction in a LGM state when the touch input device is in the LGM state.

An embodiment of the present invention provides a touch input device including: a display panel having a plurality of scan lines; a touch sensor including a plurality of driving electrodes arranged in the same direction as the scan line and a plurality of receiving electrodes arranged in a direction different from the scan line; and a control unit configured to perform a touch scan so that driving signals are applied to two or more driving electrodes of the plurality of driving electrodes, in which the control unit controls a driving timing of the touch scan so that the scan line to which a display scan signal is applied of the plurality of scan lines and the driving electrodes to which the driving signals are applied are not in overlap with each other in terms of time and space.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3 are views for explaining multi-driving of the touch sensor 100 illustrated in FIG. 2;

FIG. 6 are views for explaining the multi-driving of the touch sensor 100' illustrated in FIG. 5;

FIG. 13 are views for explaining a different multi-driving of the touch sensor illustrated in FIG. 8;

DETAILED DESCRIPTION

Figure 1:
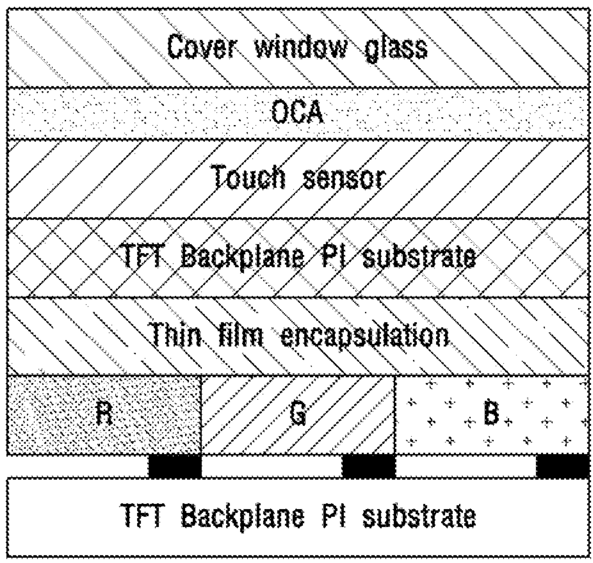
FIG. 1 is a schematic view illustrating a laminated structure of a typical OCTA method.

The present invention will now be described more fully with reference to the accompanying drawings, in which exemplary embodiments of the invention are shown. These embodiments are provided so that this disclosure will be thorough and complete, and will fully convey the concept of the invention to those skilled in the art. The invention may, however, be embodied in many different forms and should not be construed as being limited to the embodiments set forth herein. Therefore, it will be understood that the embodiments disclosed in this specification includes some variations without limitations to the shapes as illustrated in the figures. Also, the position or the arrangement of each component in the embodiment may be varied without departing form the spirit or scope of the invention. The preferred embodiments should be considered in descriptive sense only and not for purposes of limitation. Therefore, the scope of the invention is defined not by the detailed description of the invention but by the appended claims, and all differences within the scope will be construed as being included in the present invention. In the drawings, like reference numerals refer to like elements throughout.

A touch input device according to various embodiments of the present document, which is an electronic device, may include at least one of, e.g., a smartphone, a tablet personal computer (PC), a display device for a vehicle, a mobile phone, a video phone, an e-book reader, a laptop personal computer (laptop PC), a netbook computer, a mobile medical device, a camera, or a wearable device. Here, the wearable device may include at least one of an accessory device (e.g., a watch, a ring, a bracelet, an anklet, a necklace, glasses, contact lenses, or a head-mounted-device (HMD)), a fabric or integrated garment (e.g., electronic clothing), a body attachable (e.g., a skin pad or tattoo), and a bio-implantable device (e.g., an implantable circuit).

Figure 2:
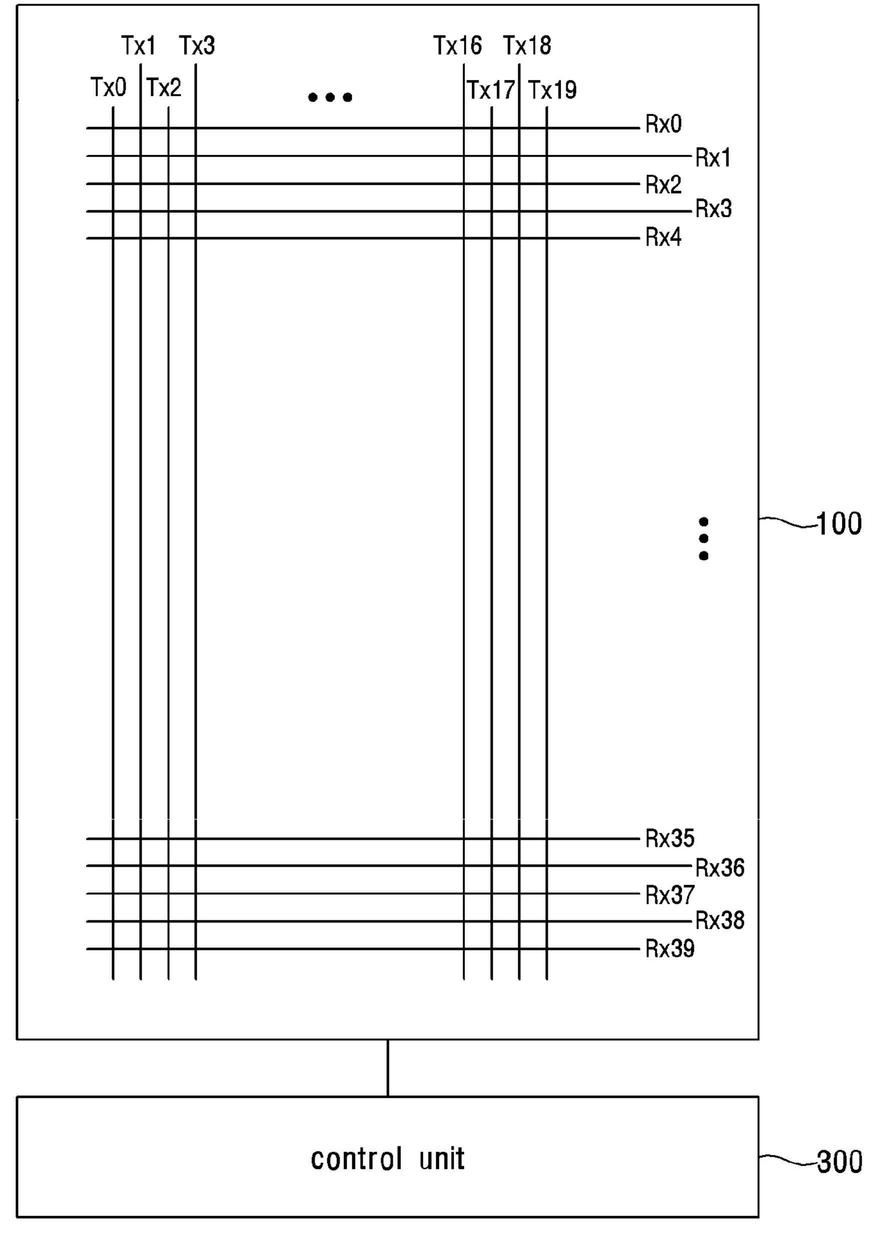
FIG. 2 is a schematic block diagram illustrating a touch input device according to an embodiment of the present invention.

FIG. 2 is a schematic block diagram illustrating a touch input device according to an embodiment of the present invention.

Referring to FIG. 2, the touch input device according to an embodiment of the present invention includes a touch sensor 100 and a control unit 300.

The control unit 300 controls the touch sensor 100.

The control unit 300 applies a driving signal (or Tx signal) to a driving electrode (Tx electrode) of the touch sensor 100 and receives a sensing signal (or Rx signal) from a receiving electrode (Rx electrode) of the touch sensor 100.

The control unit 300 may sequentially supply a driving signal to the plurality of driving electrodes of the touch sensor 100 or simultaneously supply a predetermined driving signal to at least two driving electrodes among the plurality of driving electrodes. The former is called as a sequential driving method, and the latter is called as a multi-driving method.

The control unit 300 receives a sensing signal output from the plurality of receiving electrodes of the touch sensor 100. Here, the sensing signal may include information on capacitance variation between the receiving electrode and the driving electrode adjacent thereto, a low ground mass (LGM) noise signal, and a display noise signal.

The control unit 300 may analog-to-digital convert the sensing signal output from the plurality of receiving electrodes to output a digital sensing signal.

The control unit 300 may output two differential signals among the signals output from the plurality of receiving electrodes and perform analog-to-digital conversion on the output differential signals. To this end, the control unit 300 may include a comparator and an ADC. The control unit 13 may detect whether a touch is generated and/or a touch position based on the digital signal output from the control unit 300.

In FIG. 2, the control unit 300 may be realized as one module, unit, or chip. However, the embodiment of the present invention is not limited thereto. For example, the control unit 300 may be divided into a sensing part that receives a sensing signal from the receiving electrode of the touch sensor 100, a driving part that applies a driving signal to the driving electrode of the touch sensor 100, and a control part that controls the sensing part and the driving part. Alternatively, at least two of the sensing part, driving part, and control part may be realized as one module, unit, or chip.

Although not shown, the touch input device in FIG. 2 may include a display panel (not shown). The touch sensor 100 may be disposed on a cell of the display panel as with the OCTA method illustrated in FIG. 1 or disposed in the cell of the display panel as with an in-cell method. Depending on cases, the touch sensor 100 may be disposed below the display panel. For example, the touch sensor 100 may be directly formed on an outer surface (e.g., a top surface of an upper substrate or a bottom surface of a lower substrate) or an inner surface (e.g., a bottom surface of the upper substrate or a top surface of the lower substrate) of the upper substrate and/or the lower substrate of the display panel. The touch sensor 100 may be coupled to the display panel to constitute a touch screen panel (TSP).

A plurality of scan lines (or gate lines) and a plurality of data lines may be disposed on the display panel. A subpixel may be disposed in an area in which the scan line crosses the data line.

The display panel may include an active area on which a plurality of subpixels is disposed and an inactive area disposed outside the active area. The active area may constitute a display screen of the touch input device. The display screen may have a rectangular shape in which a vertical length is greater than a horizontal length.

The touch input device illustrated in FIG. 2 may include a gate driving circuit, a data driving circuit, and a display control unit for driving various signal lines disposed on the display panel in order to drive the display panel.

The gate driving circuit may be controlled by the display control unit and control a driving timing of the plurality of subpixels by sequentially outputting a display scan signal to the plurality of scan lines disposed on the display panel.

The data driving circuit may receive image data from the display control unit and convert the image data into an analog type data voltage. The data driving circuit may control each subpixel to emit brightness according to the image data by outputting the data voltage (Vdata) to each data line in accordance with a timing when the scan signal is applied through the scan line.

The display control unit may supply various control signals to the gate driving circuit and the data driving circuit and control operations of the gate driving circuit and the data driving circuit. The display control unit may be provided separately from or integrated with the control unit 300 in FIG. 2.

The touch sensor 100 includes the plurality of electrodes (or a plurality of sensors) each having a predetermined shape, and the predetermined electrodes include a plurality of first electrodes and a plurality of second electrodes. Here, when the driving signal is applied to the plurality of first electrodes, the plurality of first electrodes may be the plurality of driving electrodes, and the plurality of second electrodes may be the plurality of receiving electrodes.

The plurality of driving electrodes Tx0, Tx1, Tx2, Tx3 . . . Tx16, Tx17, Tx18, and Tx19 and the plurality of receiving electrodes Rx0, Rx1, Rx2, Rx3 . . . Rx35, Rx36, and Rx37 may be arranged to intersect each other. A predetermined mutual capacitance Cm may be formed between the plurality of driving electrodes Tx0, Tx1, Tx2, Tx3 . . . Tx16, Tx17, Tx18, and Tx19 and the plurality of receiving electrodes Rx0, Rx1, Rx2, Rx3 . . . Rx35, Rx36, and Rx37, particularly at an intersection thereof.

Each of the driving electrodes Tx0, Tx1, Tx2, Tx3 . . . Tx16, Tx17, Tx18, and Tx19 may be arranged in a first axis direction (or vertical direction), and each of the receiving electrodes Rx0, Rx1, Rx2, Rx3 . . . Rx35, Rx36, and Rx37 may be arranged in a second axis direction (or horizontal direction) different from the first axis direction. Here, the second axis direction may be perpendicular to the first axis direction. The first axis direction may be referred to as a major axis direction, and the second axis direction may be referred to as a minor axis direction.

In the touch sensor 100 illustrated in FIG. 2, each of the driving electrodes Tx0, Tx1, Tx2, Tx3 . . . Tx16, Tx17, Tx18, and Tx19 has a length greater than that of each of the receiving electrodes Rx0, Rx1, Rx2, Rx3 . . . Rx35, Rx36, and Rx37. Also, in the touch sensor 100 illustrated in FIG. 2, the number of the plurality of driving electrodes Tx0, Tx1, Tx2, Tx3 . . . Tx16, Tx17, Tx18, and Tx19 is less than that of the plurality of receiving electrodes Rx0, Rx1, Rx2, Rx3 . . . Rx35, Rx36, and Rx37. This is because a vertical length is longer than a horizontal length in the display screen of the touch input device. For example, the touch input device may be a smartphone. The smartphone, as the touch input device, has a display screen, and the display screen generally has a rectangular shape in which a vertical length is longer than a horizontal length. Here, each of corners of the display screen may be curved.

As illustrated in FIG. 2, in the touch input device having the display screen in which the vertical length is greater than the horizontal length or the first axis (major axis) is greater than the second axis (minor axis), in a case in which the plurality of driving electrodes Tx0, Tx1, Tx2, Tx3 . . . Tx16, Tx17, Tx18, and Tx19 are arranged in the major axis direction, and the plurality of receiving electrodes Rx0, Rx1, Rx2, Rx3 . . . Rx35, Rx36, and Rx37 are arranged in the minor axis direction, when a predetermined driving signal is applied simultaneously to two or more driving electrodes of the plurality of driving electrodes Tx0, Tx1, Tx2, Tx3 . . . Tx16, Tx17, Tx18, and Tx19 (multi-driving), display scan and touch scan may overlap in terms of time and space to cause flicker on the display screen. The reason why the flicker occurs will be described in detail below with reference to FIGS. 3 and 4.

(a) and (b) of FIG. 3 are views for explaining multi-driving of the touch sensor 100 illustrated in FIG. 2.

As illustrated in (a) of FIG. 3, the multi-driving of the touch sensor 100 illustrated in FIG. 2 is a method of: simultaneously applying (Touch Scan 1) a predetermined driving signal to four driving electrodes Tx0, Tx1, Tx2, and Tx3 during a predetermined first time period; simultaneously applying (Touch Scan 2) the driving signal to four other driving electrodes Tx4, Tx5, Tx6, and Tx7 during a second time period after the first time period; simultaneously applying (Touch Scan 3) the driving signal to four other driving electrodes Tx8, Tx9, Tx10, and Tx11 during a third time period after the second time period; simultaneously applying (Touch Scan 4) the driving signal to four other driving electrodes Tx12, Tx13, Tx14, and Tx15 during a fourth time period after the third time period; and simultaneously applying (Touch Scan 5) the driving signal to four other driving electrodes Tx16, Tx17, Tx18, and Tx19 during a fifth time period after the fourth time period.

In (a) of FIG. 3, Touch Scan areas indicate areas of four driving electrodes to which four driving signals are simultaneously applied during the same time period for convenience of explanation.

(b) of FIG. 3 is an example of driving signals that are simultaneously applied to the four driving electrodes in each Touch Scan. Each of the driving signals may be assigned a code expressed as either 1 or −1 for each predetermined time period t1, t2, t3, and t4. The driving signal applied to Tx0 has codes expressed as 1, 1, 1, and −1, and the driving signal applied to Tx1 has codes expressed as 1, 1, −1, and 1. The driving signal applied to Tx2 has codes expressed as 1, −1, 1, 1, and the driving signal applied to Tx3 has codes expressed as −1, 1, 1, 1.

Referring to (b) of FIG. 3, a sum of codes obtained by adding the driving signals applied to the four driving electrodes Tx0, Tx1, Tx2, and Tx3 for each predetermined time period t1, t2, t3, and t4 is '2'. When a voltage (driving voltage) of each driving signal is 10 V as an example, a driving voltage of 20 V corresponding to 2 (sum)×10 V may be applied to the display panel adjacent to the touch sensor 100 to cause the flicker on the display screen.

Figure 4:
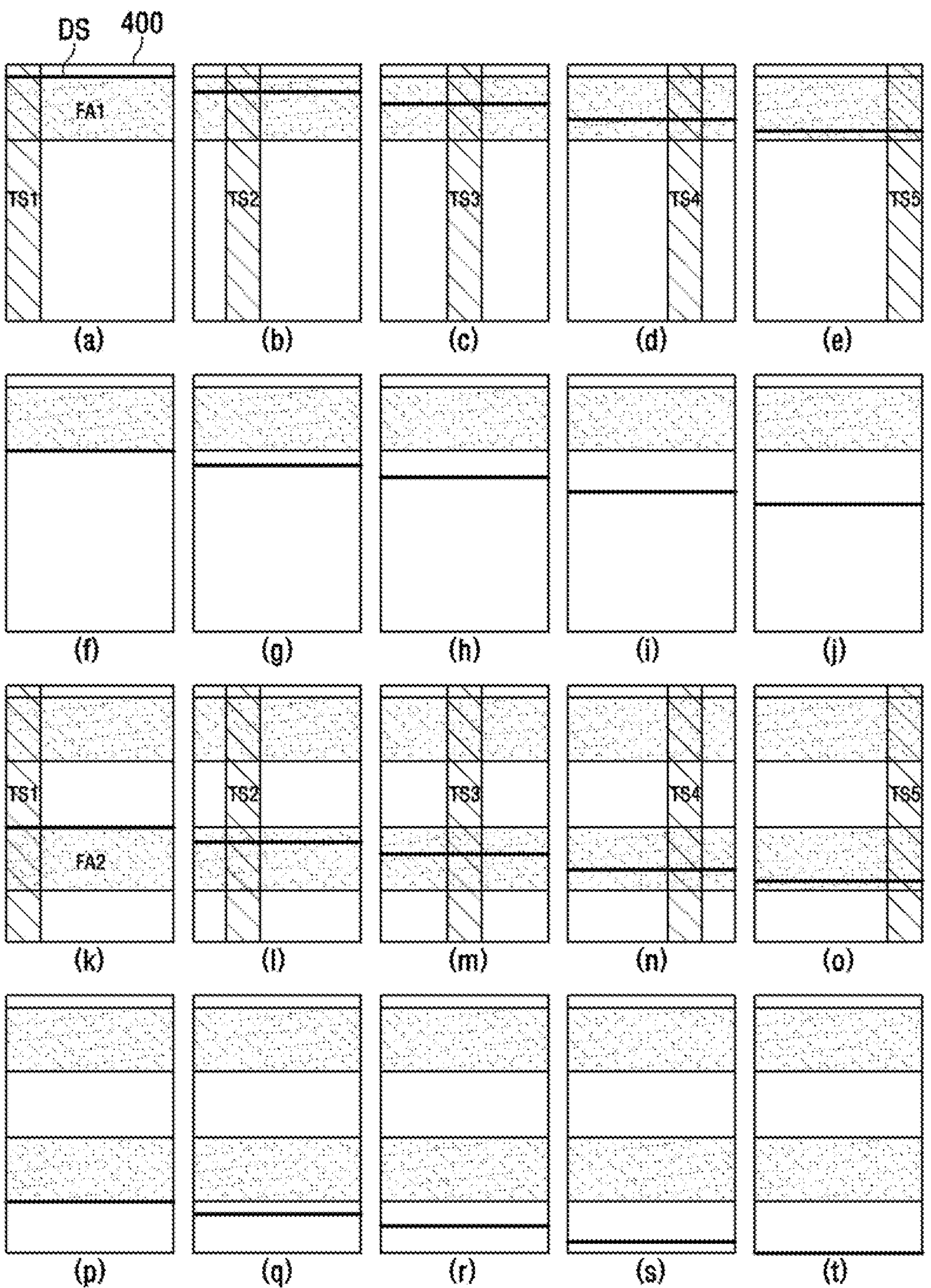
FIG. 4 are views for explaining a mechanism by which a flicker occurs on a display screen 400 by the multi-driving illustrated in (a) and (b) of FIG. 3.

(a) to (t) of FIG. 4 are views for explaining a mechanism by which a flicker occurs on a display screen 400 by the multi-driving illustrated in (a) and (b) of FIG. 3.

In (a) to (t) of FIG. 4, it is assumed that the scan line of the display panel of the touch input device is formed in the minor axis direction of the display screen 400.

(a) to (t) of FIG. 4 are views illustrating that a display scan DS moves in the major axis direction on the display screen 400 over time, and five touch scans TS1, TS2, TS3, TS4, and TS5 are performed on the plurality of driving electrodes arranged in the major axis direction. Here, (a) to (t) of FIG. 4 assume that the display scan DS is performed at 120 Hz per second and the five touch scans TS1, TS2, TS3, TS4, and TS5 are performed at 240 Hz per second.

Referring to (a) to (e) of FIG. 4, during a time in which the five touch scans TS1, TS2, TS3, TS4, and TS5 are performed, since areas of the five touch scans TS1, TS2, TS3, TS4, and TS5 and an area of the display scan DS always overlap each other, the flicker may occur on a first area FA1 of the display screen 400.

Referring to (f) to (j) of FIG. 4, since the touch scan is not generated during this time, the flicker does not occur on the display screen 400.

Referring to (k) to (o) of FIG. 4, during a time in which the five touch scans TS1, TS2, TS3, TS4, and TS5 are performed, since areas of the five touch scans TS1, TS2, TS3, TS4, and TS5 and an area of the display scan DS always overlap each other, the flicker may occur on a first area FA2 of the display screen 400.

Referring to (p) to (t) of FIG. 4, since the touch scan is not generated during this time, the flicker does not occur on the display screen 400.

As illustrated in (a) to (t) of FIG. 4, when the five touch scans TS1, TS2, TS3, TS4, and TS5 are performed by the multi-driving in the major axis direction of the display screen 400, since an area in which an area of the touch scan and an area of the display scan overlap each other is generated during a specific time period, the flicker may occur on the first and second areas FA1 and FA2 of the display screen 400 during the specific time period. Hereinafter, touch input devices capable of preventing the flicker from occurring according to other embodiments of the present invention will be described.

Figure 5:
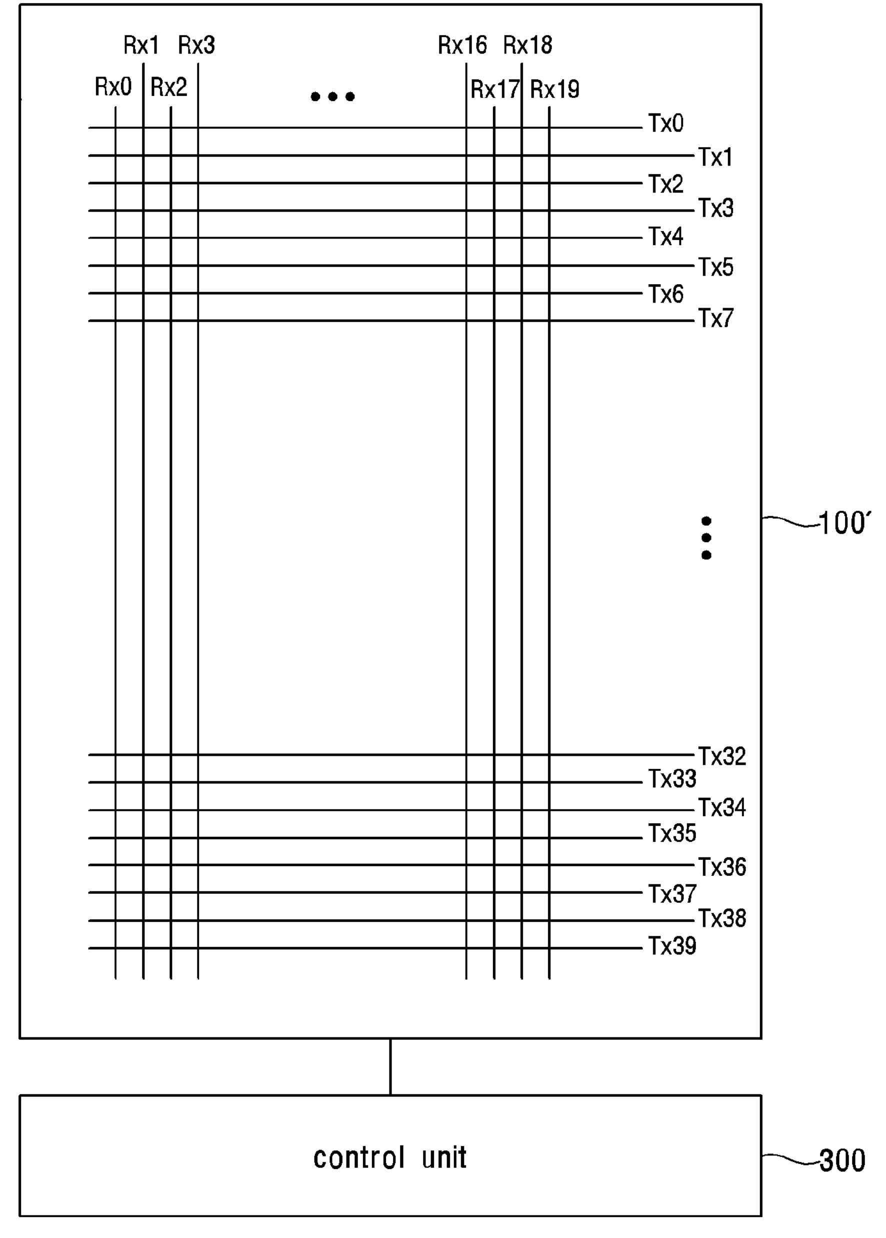
FIG. 5 is a schematic block diagram illustrating a touch input device according to another embodiment of the present invention.

FIG. 5 is a schematic block diagram illustrating a touch input device according to another embodiment of the present invention.

The touch input device according to another embodiment of the present invention illustrated in FIG. 5 is different in the touch sensor 100' from the touch input device illustrated in FIG. 2.

The touch sensor 100' illustrated in FIG. 5 is included in the touch input device and includes a plurality of driving electrodes Tx0, Tx1, . . . , Tx38, and Tx39 and a plurality of receiving electrodes Rx0, Rx1, . . . , Rx18, and Rx19. Here, the plurality of receiving electrodes Rx0, Rx1, . . . , Rx18, and Rx19 are arranged in the major axis (first axis) direction of the display screen, and the plurality of driving electrodes Tx0, Tx1, . . . , Tx38, and Tx39 are arranged in the minor axis (second axis) direction. This is opposite to the arrangement direction of the plurality of driving electrodes and the plurality of receiving electrodes of the touch sensor 100 illustrated in FIG. 2. That is, the touch sensor illustrated in FIG. 2 has a major axis simultaneous driving method, and the touch sensor illustrated in FIG. 5 has a minor axis simultaneous driving method. Here, although not shown in drawings, when the touch input device is a tablet, the first axis may serve as the minor axis, and the second axis may serve as the major axis. Since whether the first axis or the second axis has a relatively greater length is varied depending on the touch input device, the technical feature of the present invention is not limited to the relative lengths of the first and second axes.

The touch input device includes a display panel having a plurality of scan lines. Here, unlike FIG. 2, the scan lines are arranged in the same direction as the plurality of driving electrodes Tx0, Tx1, . . . , Tx38, and Tx39.

(a) and (b) of FIG. 6 are views for explaining the multi-driving of the touch sensor 100' illustrated in FIG. 5.

As illustrated in (a) of FIG. 6, the touch input device according to another embodiment of the present invention may perform the multi-driving in which a predetermined driving signal is simultaneously applied to each of the eight driving electrodes for a predetermined time t1 to t8 by the control unit 300. When the total number of the plurality of driving electrodes is 40, the 40 driving electrodes Tx0, Tx1, . . . , Tx38, and Tx39 may be multi-driven with 5 touch scans.

(b) of FIG. 6 shows an example of expressing a digital driving signal applied to eight driving electrodes Tx0, Tx1, Tx2, Tx3, Tx4, Tx5, Tx6, and Tx7 as a code. In an example of the driving signals shown in (b) of FIG. 6, a sum of codes of the driving signals in a first specific time period t1, t2, t3, and t4 is '4', and a sum of the codes of the driving signals in a second specific time period t5, t6, t7, and t8 is '0'.

When the above-described (a) to (b) of FIG. 6 are compared with (a) to (b) of FIG. 3 during the same time period t1 to t4, the (a) to (b) of FIG. 6 have the same effect of simultaneously driving four driving electrodes because eight channel minor axis simultaneous driving is performed, and a sum of codes of each time period is '4'. The (a) to (b) of FIG. 3 have the same effect of simultaneously driving two driving electrodes because four channel major axis simultaneous driving is performed, and a sum of codes of each time period is '2'.

Here, when it is assumed that the vertical length of the display screen is two times of the horizontal length, a flicker effect caused by the multi-driving of (a) and (b) of FIG. 6 during the time period t1 to t4 is expected to be almost the same as that caused by the multi-driving of (a) and (b) of FIG. 3. However, the touch input device illustrated in FIG. 5 may prevent the flicker from occurring by controlling a driving timing of the touch scan so that the display scan and the touch scan do not overlap spatially at the same time when the touch sensor 100' is multi-driven. Hereinafter, a description will be made with reference to (a) to (t) of FIG. 7.

Figure 7:
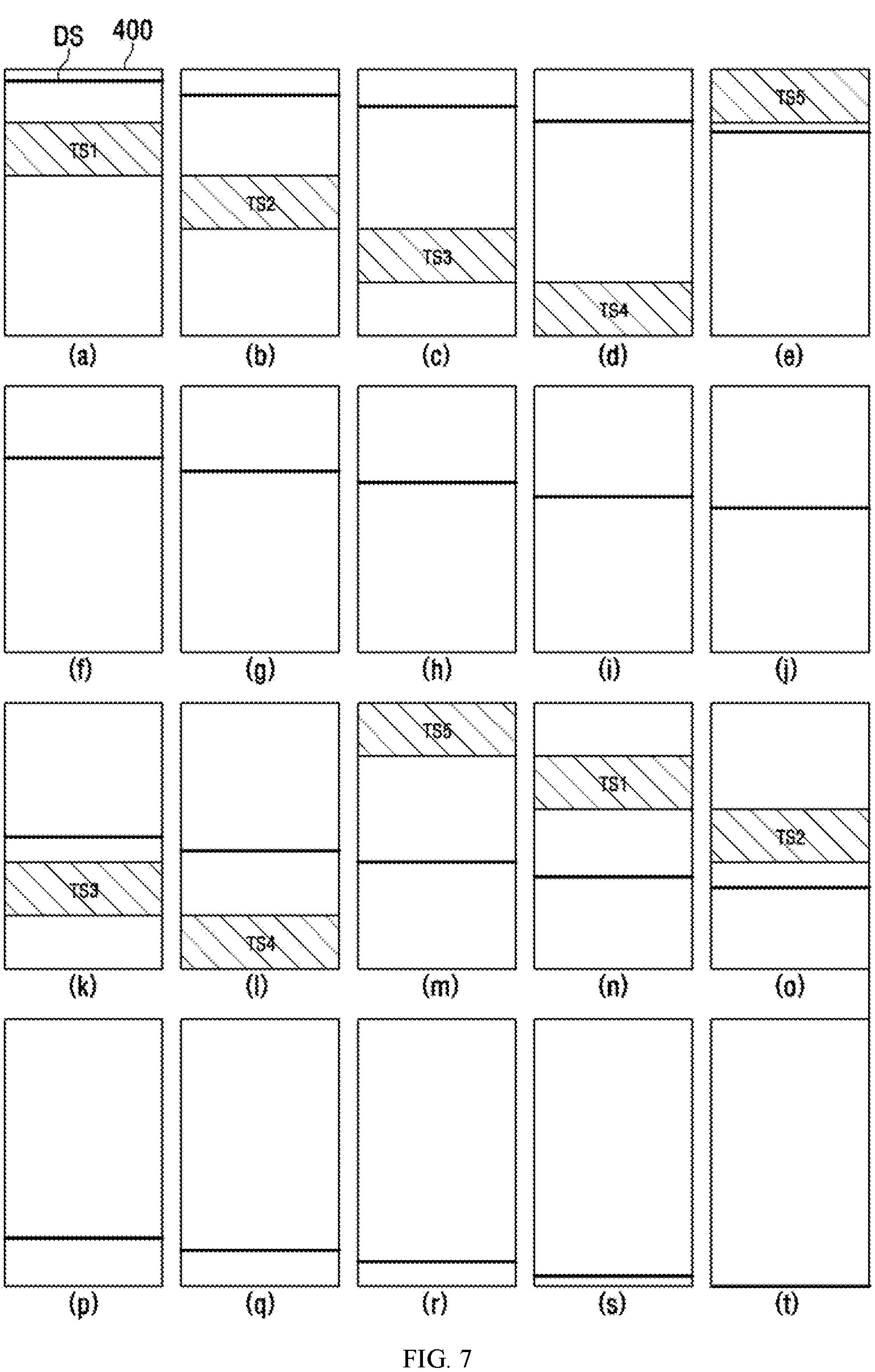
FIG. 7 are views for explaining a mechanism by which a flicker does not occurs on a display screen even by the multi-driving illustrated in (a) and (b) of FIG. 6.

(a) to (t) of FIG. 7 are views for explaining a mechanism by which a flicker occurs on a display screen by the multi-driving illustrated in (a) and (b) of FIG. 6.

(a) to (t) of FIG. 7 are views illustrating that a display scan DS moves in the major axis direction on the display screen 400 over time, and five touch scans TS1, TS2, TS3, TS4, and TS5 are performed on the plurality of driving electrodes arranged in the minor axis direction. Here, (a) to (t) of FIG. 7 assume that the display scan DS is performed at 120 Hz per second (frequency of 4.2 ms) and the five touch scans TS1, TS2, TS3, TS4, and TS5 are performed at 240 Hz per second.

Referring to (a) to (e) of FIG. 7, during a time in which the five touch scans TS1, TS2, TS3, TS4, and TS5 are performed, since areas of the five touch scans TS1, TS2, TS3, TS4, and TS5 and an area of the display scan DS do not overlap each other, the flicker does not occur on any area of the display screen 400.

Referring to (f) to (j) of FIG. 7, since the touch scan is not performed during this time, the flicker does not occur on the display screen 400.

Referring to (k) to (o) of FIG. 7, during a time in which the five touch scans TS1, TS2, TS3, TS4, and TS5 are performed, since areas of the five touch scans TS1, TS2, TS3, TS4, and TS5 and an area of the display scan DS do not overlap each other, the flicker does not occur on any area of the display screen 400.

Referring to (p) to (t) of FIG. 7, since the touch scan is not performed during this time, the flicker does not occur on the display screen 400.

The plurality of touch scans and the display scan may not overlap each other to perform the minor axis simultaneous driving shown in (a) to (t) of FIG. 7. To this end, the control unit 300 illustrated in FIG. 5 may simultaneously apply different driving signals for a predetermined time to four or more driving electrodes among the plurality of driving electrodes of the touch sensor 100' arranged in the same direction as the scan line of the display panel, while controlling the display scan DS not to be performed on one area of the display screen 400, which overlaps the four or more driving electrodes. Alternatively, the control unit 300 may control the driving timing so that five touch scans TS1, TS2, TS3, TS4, and TS5 are performed on only an area in which the display scan DS is not performed on the display screen 400.

Figure 8:
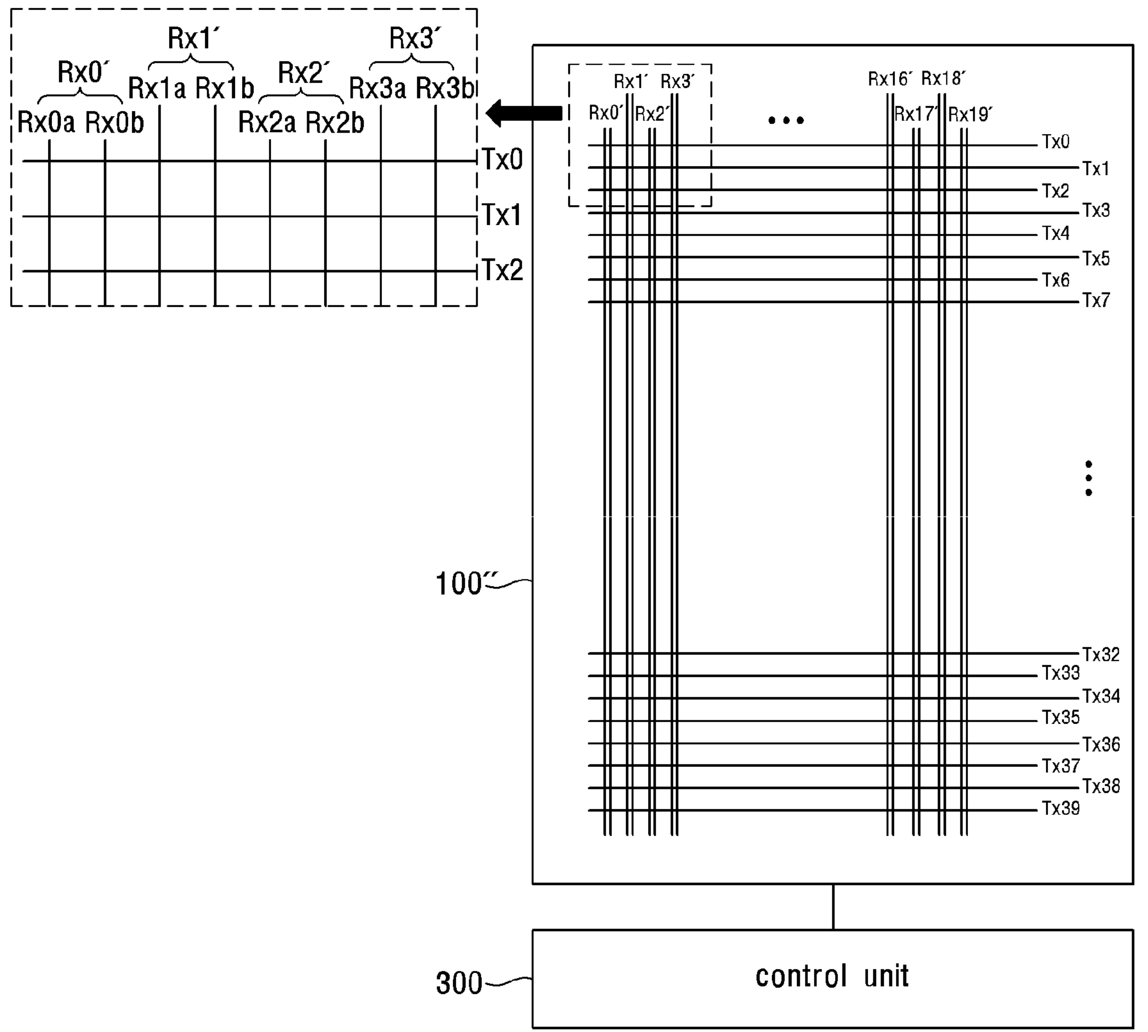
FIG. 8 is a schematic block diagram illustrating a touch input device according to another embodiment of the present invention.

FIG. 8 is a schematic block diagram illustrating a touch input device according to another embodiment of the present invention.

The touch input device illustrated in FIG. 8 according to another embodiment of the present invention is different in a touch sensor 100" from the touch input device illustrated in FIG. 5.

The touch sensor 100" illustrated in FIG. 8 is different in a plurality of receiving electrodes Rx0', Rx1', . . . , Rx18', and Rx19' from the touch sensor 100' illustrated in FIG. 5. Specifically, each of the plurality of receiving electrodes Rx0', Rx1', . . . , Rx18', and Rx19' includes first receiving electrodes Rx0*a*, Rx1*a*, Rx2*a*, Rx3*a*, . . . and second receiving electrodes Rx0*b*, Rx1*b*, Rx2*b*, Rx3*b* . . . .

The first receiving electrodes Rx0*a*, Rx1*a*, Rx2*a*, Rx3*a*, . . . may form the mutual capacitance cm with some driving electrodes Tx0, Tx2, Tx4, Tx6, . . . , Tx32, Tx34, Tx36, and Tx38 of a plurality of driving electrodes Tx0, Tx1, Tx2, . . . , Tx38, and Tx39 and may form little or no mutual capacitance cm with remaining driving electrodes Tx1, Tx3, Tx5, Tx7, . . . , Tx33, Tx35, Tx37, and Tx39. Here, the forming of the little mutual capacitance cm may represent a mutual capacitance value that is relatively small compared with the mutual capacitance cm with the some driving electrodes Tx0, Tx2, Tx4, Tx6, . . . , Tx32, Tx34, Tx36, and Tx38.

The second receiving electrodes Rx0*b*, Rx1*b*, Rx2*b*, Rx3*b*, . . . may form the mutual capacitance cm with the remaining driving electrodes Tx1, Tx3, Tx5, Tx7, . . . , Tx33, Tx35, Tx37, and Tx39 of the plurality of driving electrodes Tx0, Tx1, Tx2, . . . , Tx38, and Tx39 and may form little or no mutual capacitance cm with the some driving electrodes Tx0, Tx2, Tx4, Tx6, . . . , Tx32, Tx34, Tx36, and Tx38. Here, the forming of the little mutual capacitance cm may represent a mutual capacitance value that is relatively small compared with the mutual capacitance cm with the remaining driving electrode Tx1, Tx3, Tx5, Tx7, . . . , Tx33, Tx35, Tx37, and Tx39.

The first receiving electrodes Rx0*a*, Rx1*a*, Rx2*a*, Rx3*a*, . . . may be disposed directly adjacent to the some driving electrodes Tx0, Tx2, Tx4, Tx6, . . . , Tx32, Tx34, Tx36, and Tx38 of the plurality of driving electrodes Tx0, Tx1, Tx2, . . . , Tx38, and Tx39 and be spaced a predetermined distance from the remaining driving electrodes Tx1, Tx3, Tx5, Tx7, . . . , Tx33, Tx35, Tx37, and Tx39 instead of being directly adjacent thereto. Here, at least one different electrode may be disposed between the first receiving electrodes Rx0*a*, Rx1*a*, Rx2*a*, Rx3*a*, . . . and the remaining driving electrode Tx1, Tx3, Tx5, Tx7, . . . , Tx33, Tx35, Tx37, and Tx39. The different electrode may be at least one of the some driving electrodes Tx0, Tx2, Tx4, Tx6, . . . , Tx32, Tx34, Tx36, and Tx38.

The second receiving electrodes Rx0*b*, Rx1*b*, Rx2*b*, Rx3*b*, . . . may be disposed directly adjacent to the remaining driving electrodes Tx1, Tx3, Tx5, Tx7, . . . , Tx33, Tx35, Tx37, and Tx39 of the plurality of driving electrodes Tx0, Tx1, Tx2, . . . , Tx38, and Tx39 and be spaced a predetermined distance from the some driving electrodes Tx0, Tx2, Tx4, Tx6, . . . , Tx32, Tx34, Tx36, and Tx38 instead of being directly adjacent thereto. Here, at least one different electrode may be disposed between the second receiving electrodes Rx0*b*, Rx1*b*, Rx2*b*, Rx3*b*, . . . and the some driving electrode Tx0, Tx2, Tx4, Tx6, . . . , Tx32, Tx34, Tx36, and Tx38. The different electrode may be at least one of the remaining driving electrodes Tx1, Tx3, Tx5, Tx7, . . . , Tx33, Tx35, Tx37, and Tx39.

When a multi-driving signal is applied to the some driving electrode Tx0, Tx2, Tx4, Tx6, . . . , Tx32, Tx34, Tx36, and Tx38 by the control unit 300, the mutual capacitance Cm is formed or a first signal is output from the directly adjacent first receiving electrode Rx0*a*, Rx1*a*, Rx2*a*, Rx3*a*, . . . , or the mutual capacitance Cm is not substantially formed or a second signal is output from the directly adjacent second receiving electrode Rx0*b*, Rx1*b*, Rx2*b*, Rx3*b*, . . . . The control unit 300 may output a differential signal by subtracting the output first and second signals and detect a touch position based on the differential signal. Here, the first signal includes information on an amount of variation in mutual capacitance caused by an object, a display noise (e.g., Zebra noise), an amount of variation caused by image change, a LGM noise in a floating state, and a cathode re-transmission phenomenon (as a size of a resistance RELVSS of an ELVSS layer increases (i.e., as a GND decreases), a high-frequency signal is also transmitted to the receiving electrode of the touch sensor and added to a main signal). Also, although the information on the amount of variation in mutual capacitance caused by the object exists slightly in the second signal, the information on the amount of the variation in mutual capacitance caused by the object is contained in the rest noise information such as the display noise (e.g., Zebra noise), the amount of variation caused by image change, the LGM noise in the floating state, and the cathode re-transmission phenomenon as much as substantially the same or similar to noise information contained in the first signal. Thus, since the control unit 300 subtracts the second signal from the first signal, almost no noise information may exist in the subtracted signal, and the information on the amount of variation in mutual capacitance caused by the differentiated object may be contained therein.

When the driving signal is applied to the remaining driving electrode Tx1, Tx3, Tx5, Tx7, . . . , Tx33, Tx35, Tx37, and Tx39 by the control unit 300, the mutual capacitance Cm is formed or the second signal is output from the directly adjacent second receiving electrode Rx0*b*, Rx1*b*, Rx2*b*, Rx3*b*, . . . , or the mutual capacitance Cm is not substantially formed or the first signal is output from the directly adjacent first receiving electrode Rx0*a*, Rx1*a*, Rx2*a*, Rx3*a*, . . . . The control unit 300 may output a differential signal by differentiating the first signal from the output second signal and detect a touch position based on the differential signal. Here, since the second signal contains the information on the amount of variation in mutual capacitance caused by the object, almost no noise information exists in the signal obtained by subtracting the first signal from the second signal, and only the information on the amount of variation in mutual capacitance caused by the object is contained therein.

The plurality of driving electrodes Tx0, Tx1, Tx2, . . . , Tx and the plurality of receiving electrodes Rx0, Rx1, Rx2, . . . may be arranged together on the same layer (1 layer), or may be disposed respectively in different double layers (2 layers). Alternatively, some of the plurality of driving electrodes Tx0, Tx1, Tx2, . . . may be disposed on a different layer from the others, and some of the plurality of receiving electrodes Rx0, Rx1, Rx2, . . . may be disposed on a different layer from the others. The plurality of driving electrodes Tx0, Tx1, Tx2, . . . and the plurality of receiving electrodes Rx0, Rx1, Rx2, . . . may each have a diamond pattern, circular, oval or polygonal shape.

The plurality of driving electrodes Tx0, Tx1, Tx2, . . . and the plurality of receiving electrodes Rx0, Rx1, Rx2, . . . may be made of a metal mesh and patterned on a thin film encapsulation (TFE) layer of the display panel.

The touch input device illustrated in FIG. 8 may perform the multi-driving as in (a) and (b) of FIG. 6 and prevent the flicker from occurring by controlling the multi-driving of the touch sensor 100" because the plurality of driving electrodes of the touch sensor 100" are arranged in the same direction as the scan line of the display panel.

That is, as illustrated in (a) and (b) of FIG. 6, the multi-driving may be performed through five touch scans by simultaneously driving four driving electrodes. Also, the touch scan and the display scan may not overlap each other to perform the multi-driving method as illustrated in (a) to (t) of FIGS. 7. To this end, the control unit 300 illustrated in FIG. 8 may simultaneously apply preset driving signals to two or more adjacent driving electrodes among the plurality of driving electrodes of the touch sensor 100" arranged in the same direction as the scan line of the display panel, while controlling the display scan DS not to be performed on one area of the display screen, which overlaps the two or more driving electrodes during a time of applying the driving signal to the two or more driving electrodes. Alternatively, the control unit 300 may control so that the multi-driving is performed on only an area in which the display scan DS is not performed on the display screen.

FIGS. 9 to 12 are views illustrating specific embodiments of the touch sensor 100" illustrated in FIG. 8.

Figure 9:
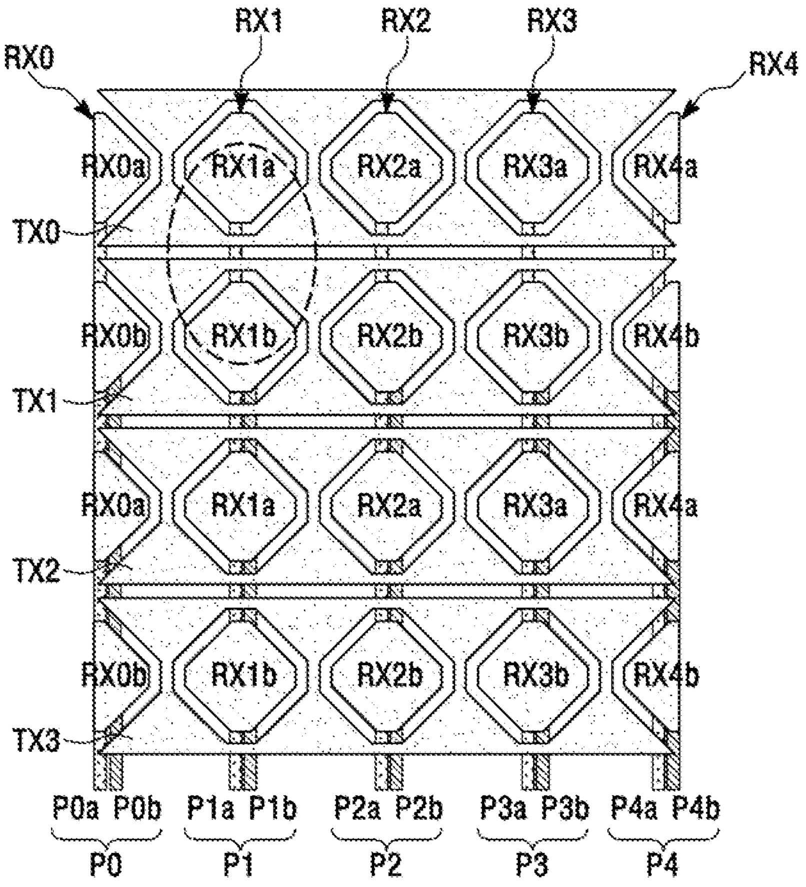
FIGS. 9 to 12 are views illustrating specific embodiments of the touch sensor 100" illustrated in FIG. 8.

FIG. 9 is a plan view illustrating an embodiment of the touch sensor 100" illustrated in FIG. 8.

Referring to FIG. 9, the touch sensor according to an embodiment of the present invention may be disposed on or in the display panel.

The touch sensor according to an embodiment of the present invention includes a plurality of first electrodes and a plurality of second electrodes. Among the plurality of first electrodes and the plurality of second electrodes, electrodes to which the driving signal is applied may serve as the driving electrodes, and the remaining electrodes may serve as the receiving electrodes. Hereinafter, the plurality of first electrodes serve as the plurality of driving electrodes TX0, TX1, TX2, TX3 . . . , and the plurality of second electrodes serve as the plurality of receiving electrodes RX0, RX1, RX2, RX3, RX4 . . . .

The plurality of driving electrodes TX0, TX1, TX2, TX3, . . . may include a 0-th driving electrode TX0, a first driving electrode TX1, a second driving electrode TX2, and a third driving electrode TX3. Here, the plurality of driving electrodes TX0, TX1, TX2, TX3 . . . correspond to the plurality of driving electrodes TX0, TX1, TX2, . . . illustrated in FIG. 8.

The plurality of receiving electrodes RX0, RX1, RX2, RX3, RX4, . . . may include a 0-th receiving electrode RX0, a first receiving electrode RX1, a second receiving electrode RX2, a third receiving electrode RX3, and a fourth receiving electrode RX4. Here, the plurality of receiving electrodes RX0, RX1, RX2, RX3, RX4, . . . correspond to the plurality of receiving electrodes RX0, RX1, Rx2, Rx4, . . . illustrated in FIG. 8.

The plurality of driving electrodes TX0, TX1, TX2, TX3 . . . , . . . may be arranged in a second direction (or vertical direction) and each extend in a first direction (or horizontal direction) perpendicular to the second direction. The plurality of receiving electrodes RX0, RX1, RX2, RX3, RX4, . . . may be arranged in the second direction. Here, on the contrary, the plurality of driving electrodes TX0, TX1, TX2, TX3 . . . , . . . may be arranged in the first direction (or horizontal direction), and the plurality of receiving electrodes RX0, RX1, RX2, RX3, RX4 . . . , . . . may be arranged in the second direction (or vertical direction).

A predetermined capacitance may be formed between the plurality of driving electrodes TX0, TX1, TX2, TX3, . . . and the plurality of receiving electrodes RX0, RX1, RX2, RX3, RX4, . . . . The capacitance is varied when a touch input is generated at a corresponding point or a surrounding thereof. Thus, whether a touch is generated or a touch input may be detected by detecting an amount of variation in capacitance from a signal output from the plurality of receiving electrodes RX0, RX1, RX2, RX3, RX4, . . . .

Each of the plurality of driving electrodes TX0, TX1, TX2, TX3 . . . may have a rectangular pattern or bar pattern shape extending in the first direction and have, therein, a plurality of openings O arranged in the first direction.

One receiving electrode may be disposed in each opening O. Each opening O has a shape corresponding to that of the one receiving electrode disposed therein. For example, as illustrated in FIG. 9, the rest except for openings disposed on left and right edges among the plurality of openings O may have a rhombus shape, and the openings disposed on the left and right edges may each have a triangular shape. Although not shown in the drawings, each of the openings O may have a rhombus shape. Also, each of the plurality of openings O may have various shapes such as a polygon, a rectangle, a circle or an oval.

Each of the receiving electrodes RX0, RX1, RX2, RX3, RX4, . . . includes a plurality of receiving electrode patterns RX0*a*, RX0*b*, RX1*a*, RX1*b*, RX2*a*, RX2*b*, RX3*a*, RX3*b*, RX4*a*, and RX4*b* and connecting patterns P0, P1, P2, P3, and P4. Here, some receiving electrode patterns RX0*a*, RX1*a*, RX2*a*, RX3*a*, and RX4*a* among the plurality of receiving electrode patterns RX0*a*, RX0*b*, RX1*a*, RX1*b*, RX2*a*, RX2*b*, RX3*a*, RX3*b*, RX4*a*, and RX4*b* may correspond to the first receiving electrodes Rx0*a*, Rx1*a*, Rx2*a*, Rx3*a*, . . . in FIG. 8, and the remaining receiving electrode patterns RX0*b*, RX1*b*, RX2*b*, RX3*b*, and RX4*b* may correspond to the second receiving electrodes Rx0*b*, Rx1*b*, Rx2*b*, Rx3*b* . . . in FIG. 8.

The plurality of driving electrodes TX0, TX1, TX2, TX3, . . . and the plurality of receiving electrode patterns RX0*a*, RX0*b*, RX1*a*, RX1*b*, RX2*a*, RX2*b*, RX3*a*, RX3*b*, RX4*a*, and RX4*b* may be disposed together on a first layer. Here, the plurality of driving electrodes TX0, TX1, TX2, TX3 . . . , . . . and the plurality of receiving electrode patterns RX0*a*, RX0*b*, RX1*a*, RX1*b*, RX2*a*, RX2*b*, RX3*a*, RX3*b*, RX4*a*, and Rx4*b*, which are disposed on the first layer, may be made of a metal mesh. The plurality of connecting patterns P0*a*, P0*b*, P1*a*, P1*b*, P2*a*, P2*b*, P3*a*, P3*b*, P4*a*, and P4*b* may be disposed on a second layer. The second layer is different from the first layer in (a) of FIG. 4 and electrically insulated from the first layer. Here, the plurality of connecting patterns P0*a*, P0*b*, P1*a*, P1*b*, P2*a*, P2*b*, P3*a*, P3*b*, P4*a*, and P4*b* may be made of a metal mesh. The first layer may be disposed on the second layer, and vice versa.

The plurality of receiving electrode patterns contained in each receiving electrode may be divided into at least two groups. The receiving electrode patterns of another group are alternately arranged between the receiving electrode patterns of one group. The receiving electrode patterns of the one group are electrically separated from the receiving electrode patterns in the another group. Here, the receiving electrode pattern in the one group may be referred to as a first receiving electrode pattern, and the receiving electrode pattern in the another group may be referred to as a second receiving electrode pattern.

The plurality of connection patterns contained in each receiving electrode include first connection patterns that electrically connect the first receiving electrode patterns in the one group and second connection patterns that electrically connect the second receiving electrode patterns in the other group.

For example, the 0-th receiving electrode RX0 may include the plurality of receiving electrode patterns RX0*a* and RX0*b* and the plurality of connection patterns P0. The plurality of receiving electrode patterns RX0*a* and RX0*b* may include the receiving electrode patterns RX0*a* of the first group and the receiving electrode patterns Rx0*b* of the second group, which are alternately arranged one by one in the second direction. The receiving electrode patterns RX0*a* of the first group and the receiving electrode patterns RX0*b* of the second group may be electrically separated from each other. The 0-th connection pattern P0 may include first connection patterns P0*a* that electrically connect the receiving electrode patterns RX0*a* of the first group and second connection patterns P0*b* that electrically connect the receiving electrode patterns Rx4*b* of the second group.

The first reception electrode RX1 may include the plurality of reception electrode patterns RX1*a* and RX1*b* and the plurality of connection patterns P1. The plurality of receiving electrode patterns RX1*a* and RX1*b* may include the receiving electrode patterns RX1*a* of the first group and the receiving electrode patterns Rx1*b* of the second group, which are alternately arranged one by one in the second direction. The receiving electrode patterns RX1*a* of the first group and the receiving electrode patterns RX1*b* of the second group may be electrically separated from each other. The first connection pattern P1 may include first connection patterns P1*a* that electrically connect the receiving electrode patterns RX1*a* of the first group and second connection patterns P1*b* that electrically connect the receiving electrode patterns RX1*b* of the second group.

The second reception electrode RX2 may include the plurality of reception electrode patterns RX2*a* and RX2*b* and the plurality of connection patterns P2. The plurality of receiving electrode patterns RX2*a* and RX2*b* may include the receiving electrode patterns RX2*a* of the first group and the receiving electrode patterns Rx2*b* of the second group, which are alternately arranged one by one in the second direction. The receiving electrode patterns RX2*a* of the first group and the receiving electrode patterns RX2*b* of the second group may be electrically separated from each other. The second connection pattern P2 may include first connection patterns P2*a* that electrically connect the receiving electrode patterns RX2*a* of the first group and second connection patterns P2*b* that electrically connect the receiving electrode patterns RX2*b* of the second group.

The third receiving electrode RX3 may include the plurality of receiving electrode patterns RX3*a* and RX3*b* and the plurality of connection patterns P3. The plurality of receiving electrode patterns RX3*a* and RX3*b* may include the receiving electrode patterns RX3*a* of the first group and the receiving electrode patterns RX3*b* of the second group, which are alternately arranged one by one in the second direction. The receiving electrode patterns RX3*a* of the first group and the receiving electrode patterns RX3*b* of the second group may be electrically separated from each other. The third connection pattern P3 may include first connection patterns P3*a* that electrically connect the receiving electrode patterns RX3*a* of the first group and second connection patterns P3*b* that electrically connect the receiving electrode patterns Rx3*b* of the second group.

The fourth receiving electrode RX4 may include the plurality of receiving electrode patterns RX4*a* and RX4*b* and the plurality of connection patterns P4. The plurality of receiving electrode patterns RX4*a* and RX4*b* may include the receiving electrode patterns Rx4*a* of the first group and the receiving electrode patterns Rx4*b* of the second group, which are alternately arranged one by one in the second direction. The receiving electrode patterns RX4*a* of the first group and the receiving electrode patterns RX4*b* of the second group may be electrically separated from each other. The fourth connection pattern P4 may include first connection patterns P4*a* that electrically connect the receiving electrode patterns RX4*a* of the first group and second connection patterns P4*b* that electrically connect the receiving electrode patterns Rx4*b* of the second group.

The plurality of receiving electrode patterns RX0*a*, RX0*b*, RX1*a*, RX1*b*, RX2*a*, RX2*b*, RX3*a*, RX3*b*, RX4*a*, and RX4*b* are disposed in the plurality of openings O of the plurality of driving electrodes TX0, TX1, TX2, TX3 . . . . One receiving electrode pattern is disposed in one opening O. Each of the receiving electrode patterns has a shape corresponding to that of the corresponding opening.

In the random receiving electrode RX1, a portion of the driving electrode TX0 directly adjacent to a periphery of the receiving electrode pattern RX1*a* of the first group and a portion of the driving electrode TX1 directly adjacent to a periphery of the receiving electrode pattern RX1*b* of the second group are disposed together between the receiving electrode pattern RX1*a* of the first group and the receiving electrode pattern RX1*b* of the second group.

The random driving electrode TX0 is disposed directly adjacent to a periphery of the receiving electrode patterns RX0*a*, RX1*a*, RX2*a*, RX3*a*, and RX4*a* of one group, and another driving electrode TX1 disposed directly adjacent to a periphery of the receiving electrode patterns RX0*a*, RX1*a*, RX2*a*, RX3*a*, and RX4*a* of another group is separated from the receiving electrode patterns RX0*a*, RX1*a*, RX2*a*, RX3*a*, and RX4*a* of one group by the random driving electrode TX0.

Each of the connection patterns P0*a*, P0*b*, P1*a*, P1*b*, P2*a*, P2*b*, P3*a*, P3*b*, P4*a*, and P4*b* may have a bar pattern shape extending in the second direction and include at least one conductive via v. The conductive via v may be disposed at both ends of each of the connection patterns.

In the 0-th receiving electrode RX0, each of the first connection patterns P0*a* electrically connects two adjacent receiving electrode patterns RX0*a* through the conductive via v among the receiving electrode patterns RX0*a* of the first group and is disposed below the receiving electrode patterns RX0*b* of the second group, which are disposed between the two adjacent receiving electrode patterns RX0*a*, to overlap the receiving electrode patterns RX0*b* of the second group. Each of the second connection patterns P0*b* electrically connects two adjacent receiving electrode patterns RX0*b* through the conductive via v among the receiving electrode patterns RX0*b* of the second group and is disposed below the receiving electrode patterns RX0*a* of the first group, which are disposed between the two adjacent receiving electrode patterns RX0*b* of the first group, to overlap the receiving electrode patterns RX0*a* of the first group. The first connection patterns P1*a*, P2*a*, P3*a*, and P4*a* and the second connection patterns P1*b*, P2*b*, P3*b*, and P4*b* of the remaining receiving electrodes RX1, RX2, RX3, and RX4 are disposed in the same manner as described above.

Hereinafter, an operation when the driving signal is applied to at least one of the plurality of driving electrodes TX0, TX1, TX2, and TX3 will be described in detail. For convenience of description, an operation of the first receiving electrode RX1 and an operation of the sensing unit 11 in FIG. 2 will be described in detail.

When the driving signal is applied sequentially or simultaneously to the plurality of driving electrodes TX0, TX1, TX2, and TX3, two sensing signals are output through the first connection pattern P1. A first signal is output through the first connection pattern P1*a*, and a second signal is output through the second connection pattern P1*b*. Thus, two channels of first and second signals are output from each of the receiving electrodes RX0, RX1, RX2, RX3, and RX4. The first and second signals are simultaneously output to the control unit 300 in FIG. 8.

Depending on the driving electrodes TX0, TX1, TX2, TX3 . . . , . . . to which a driving signal is applied, one of the first and second signals may serve as an active channel signal (or active receiving signal ARX), and the other may serve as a dummy channel signal (or dummy receiving signal DRX). Specifically, when a driving signal is applied to the driving electrodes TX0 and/or TX2 on which the receiving electrode patterns RX1*a* of the first group are arranged, the first signal output through the first connection pattern P1*a* serve as the active channel signal, and the second signal output through the second connection pattern P1*b* serve as the dummy channel signal. On the other hand, when a driving signal is applied to the driving electrodes TX1 and/or TX3 on which the receiving electrode patterns RX1*b* of the second group are arranged, the second signal output through the second connection pattern P1*b* serves as the active channel signal, and the first signal output through the first connection pattern P1*a* serves as the dummy channel signal.

For example, as illustrated in FIG. 9, when a driving signal is applied to the first driving electrode TX1 in a state in which an object (dotted line) is close to or in contact with an intersection point of the first driving electrode TX1 and the first receiving electrode RX1, a capacitance (or mutual active capacitance) formed between the first driving electrode TX1 and the receiving electrode pattern RX1*b* of the second group of the first receiving electrode RX1 is varied. The second signal including information on an amount of variation of the varied capacitance is an active channel signal output through the second connection pattern P1*b*.

Also, a capacitance (or dummy capacitance) formed between the first driving electrode TX1 and the receiving electrode patterns RX1*a* of the first group of the first receiving electrode RX1 is also varied. The first signal including information on an amount of variation of the varied capacitance is a dummy channel signal output through the first connection pattern P1*a*.

The control unit 300 illustrated in FIG. 8 may subtract the first signal output through the first connection pattern P1*a* from the second signal output through the second connection pattern P1*b* to cancel all or most of the cathode retransmission noise signal, the LGM noise signal, and the display noise signal input to the receiving electrode pattern RX1*b* of the second group and the receiving electrode pattern RX1*a* of the first group.

Figure 10:
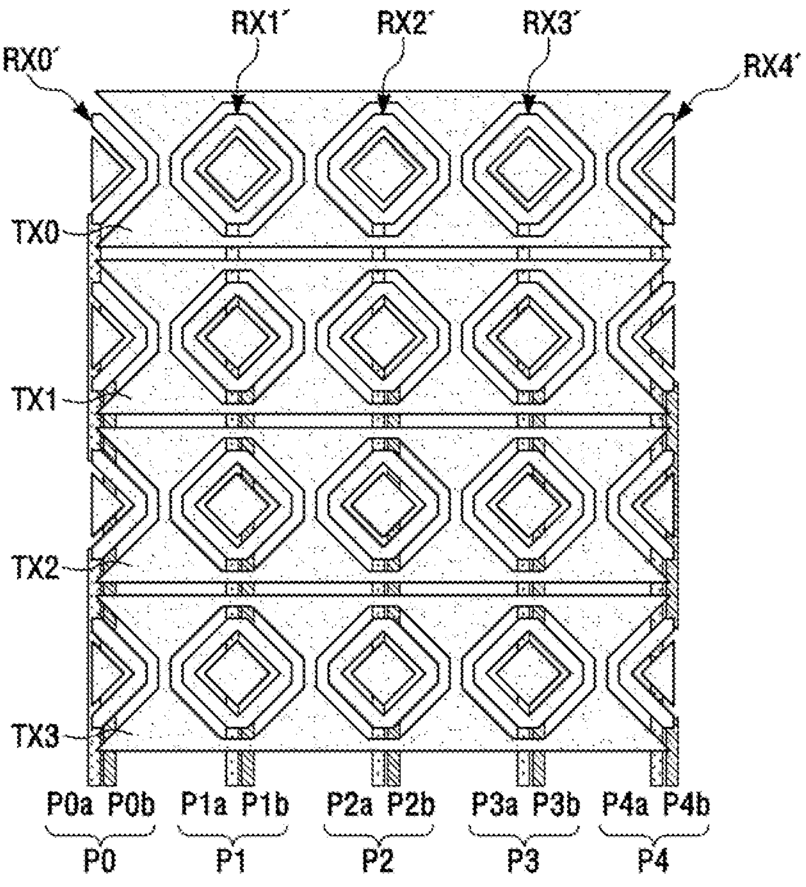

FIG. 10 is a plan view illustrating a portion of another embodiment of the touch sensor 100" in FIG. 8.

The touch sensor according to another embodiment of the present invention illustrated in FIG. 10 is different in a plurality of receiving electrodes RX0', RX1', RX2', RX3', and RX4' from the touch sensor according to an embodiment of the present invention illustrated in FIG. 9. In particular, a plurality of electrode patterns RX1*a'* contained in each of the receiving electrodes RX0', RX1', RX2', RX3', and RX4' have different structures. Hereinafter, the structures of the plurality of electrode patterns RX1*a'* will be described in detail, and the rest components will be replaced with those described above.

Each of the plurality of receiving electrode patterns RX1*a'* contained in each of the receiving electrodes RX0', RX1', RX2', RX3', and RX4' has an opening O' therein and includes a dummy pattern DX1*a* disposed in the opening O'. Here, the dummy pattern DX1*a* may have a shape corresponding to the opening O'.

The dummy pattern DX1*a* is not electrically connected to connection patterns P0*a*, P0*b*, P1*a*, P1*b*, P2*a*, P2*b*, P3*a*, P3*b*, P4*a*, and P4*b*. The dummy pattern DX1*a* maintains an electrically floating state.

An operation of the touch sensor illustrated in FIG. 10 according to another embodiment of the present invention is the same as that of the touch sensor illustrated in FIG. 9 according to an embodiment of the present invention. Thus, a touch input device including the touch sensor illustrated in FIG. 10 according to another embodiment of the present invention has an advantage of removing various noises generated during touch sensing, e.g., the display noise and the LGM noise.

Figure 11:
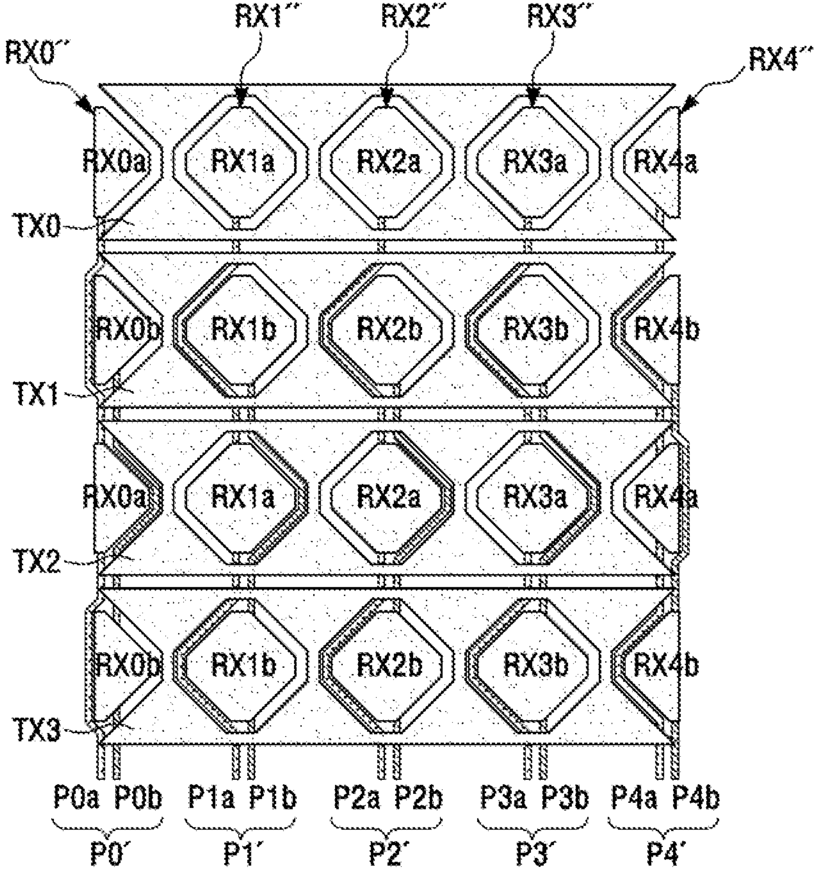

FIG. 11 is a plan view illustrating a portion of another embodiment of the touch sensor 100" in FIG. 8.

The touch sensor illustrated in FIG. 11 according to another embodiment of the present invention is different in a plurality of receiving electrodes RX0", RX1", RX2", RX3", and RX4" from the touch sensor illustrated in FIG. 9 according to an embodiment of the present invention. In particular, a plurality of connection patterns P0', P1', P2', P3', and P4' contained in each of the receiving electrodes RX0", RX1", RX2", RX3", and RX4" have different arrangement structures and shapes. Hereinafter, the arrangement structures and shapes of the connection patterns P0', P1', P2', P3', and P4' will be described in detail, and the rest components will be replaced with those described above.

Each of the connection patterns P0', P1', P2', P3', and P4' includes first connection patterns P0*a'*, P1*a'*, P2*a'*, P3*a'*, and P4*a'* and second connection patterns P0*b'*, P1*b'*, P2*b'*, P3*b'*, and P4*b'*.

Each of the first connection patterns P0*a'*, P1*a'*, P2*a'*, P3*a'*, and P4*a'* electrically connects two receiving electrode patterns RX0*a*, RX1*a*, RX2*a*, RX3*a*, and RX4*a* of the first group so as not to overlap the receiving electrode patterns RX0*b*, RX1*b*, RX2*b*, RX3*b*, and RX4*b* of the second group disposed between the two receiving electrode patterns. For example, at least a portion of each of the first connection patterns P0*a'*, P1*a'*, P2*a'*, P3*a'*, and P4*a'* may be disposed between the receiving electrode patterns RX0*b*, RX1*b*, RX2*b*, and Rx3*b* of the second group and the driving electrodes TX0, TX1, TX2, and TX3 disposed directly adjacent to the receiving electrode patterns RX0*b*, RX1*b*, RX2*b*, and RX3*b* of the second group so as not to overlap the receiving electrode patterns RX0*b*, RX1*b*, RX2*b*, RX3*b*, and Rx4*b* of the second group. Also, the rest portion may be disposed to overlap the driving electrodes TX0, TX1, TX2, and TX3.

Each of the second connection patterns P0*b*', P1*b*', P2*b*', P3*b*', and P4*b*' electrically connects two receiving electrode patterns RX0*a*, RX1*a*, RX2*a*, RX3*a*, and RX4*a* of the second group so as not to overlap the receiving electrode patterns RX0*a*, RX1*a*, RX2*a*, RX3*a*, and RX4*a* of the first group disposed between the two receiving electrode patterns. For example, at least a portion of each of the second connection patterns P0*b*', P1*b*', P2*b*', P3*b*', and P4*b*' may be disposed between the receiving electrode patterns RX0*a*, RX1*a*, RX2*a*, RX3*a*, and RX4*a* of the first group and the driving electrodes TX0, TX1, TX2, and TX3 disposed directly adjacent to the receiving electrode patterns RX0*a*, RX1*a*, RX2*a*, RX3*a*, and RX4*a* of the first group so as not to overlap the receiving electrode patterns RX0*a*, RX1*a*, RX2*a*, RX3*a*, and Rx4*a* of the first group. Also, the rest portion may be disposed to overlap the driving electrodes TX0, TX1, TX2, and TX3.

The touch sensor according to another embodiment of the present invention may have an advantage of reducing a capacitance value between the first connection pattern and the receiving electrode patterns of the second group or between the second connection patterns and the receiving electrode patterns of the first group in comparison with the touch sensor in FIG. 9 according to an embodiment of the present invention.

Although not shown in the drawings, the dummy pattern DX1*a* in FIG. 10 may be applied to the touch sensor according to another embodiment of the present invention.

Figure 12:
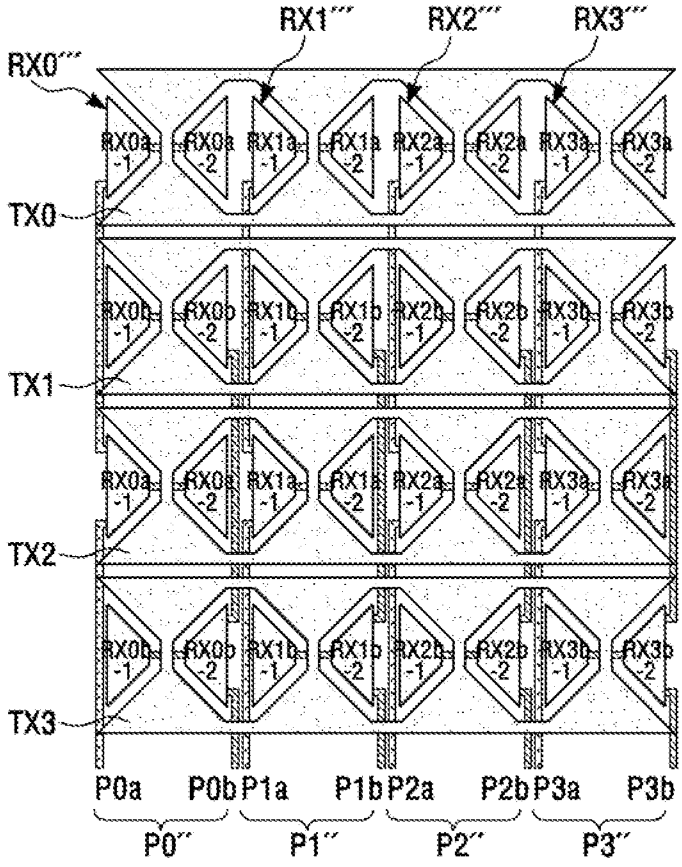

FIG. 12 is a plan view illustrating a portion of another embodiment of the touch sensor 100" in FIG. 8.

The touch sensor illustrated in FIG. 12 according to another embodiment of the present invention is different in a plurality of receiving electrodes RX0", RX1", RX2", and RX3" from the touch sensor illustrated in FIG. 9 according to an embodiment of the present invention. In particular, a plurality of receiving electrode patterns RX0*a*-1, RX0*a*-2, RX0*b*-1, RX0*b*-2, RX1*a*-1, RX1*a*-2, RX1*b*-1, RX1*b*-2, RX2*a*-1, RX2*a*-2, RX2*b*-1, RX2*b*-2, RX3*a*-1, RX3*a*-2, RX3*b*-1, and RX3*b*-2 and a plurality of connection patterns P0", P1", P2", and P3" contained in each of the receiving electrodes RX0'", RX1'", RX2'", and RX3'" have different structures and arrangement shapes. Hereinafter, the structures and arrangement shapes of the receiving electrode patterns RX0*a*-1, RX0*a*-2, RX0*b*-1, RX0*b*-2, RX1*a*-1, RX1*a*-2, RX1*b*-1, RX1*b*-2, RX2*a*-1, RX2*a*-2, RX2*b*-1, RX2*b*-2, RX3*a*-1, RX3*a*-2, RX3*b*-1, and RX3*b*-2 and the connection patterns P0", P1", P2", and P3" will be described in detail, and the rest components will be replaced with those described above.

The plurality of receiving electrode patterns RX0*a*-1, RX0*a*-2, RX0*b*-1, RX0*b*-2, RX1*a*-1, RX1*a*-2, RX1*b*-1, RX1*b*-2, RX2*a*-1, RX2*a*-2, RX2*b*-1, RX2*b*-2, RX3*a*-1, RX3*a*-2, RX3*b*-1, and RX3*b*-2 of each of the receiving electrodes RX0'", RX1'", RX2'", and RX3'" include the receiving electrode patterns RX0*a*-1, RX0*a*-2, RX1*a*-1, RX1*a*-2, RX2*a*-1, RX2*a*-2, RX3*a*-1, and RX3*a*-2 of the first group and the receiving electrode patterns RX0*b*-1, RX0*b*-2, RX1*b*-1, RX1*b*-2, RX2*b*-1, RX2*b*-2, RX3*b*-1, and Rx3*b*-2 of the second group, which are alternately arranged one by one in the second direction. The receiving electrode patterns RX0*a*-1, RX0*a*-2, RX1*a*-1, RX1*a*-2, RX2*a*-1, RX2*a*-2, RX3*a*-1, and RX3*a*-2 of the first group and the receiving electrode patterns RX0*b*-1, RX0*b*-2, RX1*b*-1, RX1*b*-2, RX2*b*-1, RX2*b*-2, RX3*b*-1, and RX3*b*-2 of the second group may be electrically separated from each other.

Each of the first group of reception electrode patterns RX0*a*-1, RX0*a*-2, RX1*a*-1, RX1*a*-2, RX2*a*-1, RX2*a*-2, RX3*a*-1, and RX3*a*-2 includes first reception electrode patterns RX0*a*-1, RX1*a*-1, RX2*a*-1, and RX3*a*-1 and second reception electrode patterns RX0*a*-2, RX1*a*-2, RX2*a*-2, and RX3*a*-2. The first reception electrode patterns RX0*a*-1, RX1*a*-1, RX2*a*-1, and RX3*a*-1 and the second reception electrode patterns RX0*a*-2, RX1*a*-2, RX2*a*-2, and RX3*a*-2 are disposed in two opening O adjacent to each other in the first direction in the corresponding driving electrodes TX0 and TX2, respectively. One first or second reception electrode pattern is disposed in the openings disposed at both side edges among a plurality of openings O of each of the driving electrodes TX0, TX1, TX2, and TX3, and the second reception electrode pattern of the first group of reception electrode patterns of one reception electrode and the first reception electrode pattern of the first group of reception electrode patterns of another reception electrode are disposed together in the rest openings while being spaced apart from each other among the plurality of reception electrodes RX0'", RX1'", RX2'", and RX3'".

Each of the connection patterns P0", P1", P2", and P3" includes first connection patterns P0*a*", P1*a*", P2*a*", and P3*a*" electrically connecting the receiving electrode patterns RX0*a*-1, RX0*a*-2, RX1*a*-1, RX1*a*-2, RX2*a*-1, RX2*a*-2, RX3*a*-1, and RX3*a*-2 of the first group and second connection patterns P0*b*", P1*b*", P2*b*", and P3*b*" electrically connecting the receiving electrode patterns RX0*b*-1, RX0*b*-2, RX1*b*-1, RX1*b*-2, RX2*b*-1, RX2*b*-2, RX3*b*-1, and Rx3*b*-2 of the second group.

Each of the first connection patterns P0*a*", P1*a*", P2*a*", and P3*a*" and the second connection patterns P0*b*", P1*b*", P2*b*", and P3*b*" are configured and arranged to connect two adjacent receiving electrode patterns for each group with a minimum distance. For example, each of the first connection patterns P0*a*", P1*a*", P2*a*", and P3*a*" and the second connection patterns P0*b*", P1*b*", P2*b*", and P3*b*" may have one end connected to one side of a lower end of one of two adjacent receiving electrode patterns of one group and the other end connected to one side of an upper end of the other receiving electrode pattern. The rest portion except for the one end and the other end has a shape extending in the second direction and overlaps the opening O of the driving electrode with a maximum cross-sectional area instead of overlapping the receiving electrode pattern of another group disposed between the one receiving electrode pattern and the other receiving electrode pattern.

Also, each of the first connection patterns P0*a*", P1*a*", P2*a*", and P3*a*" may further include a reception connection pattern electrically connecting the first reception electrode pattern and the second reception electrode pattern of the first group of reception electrode patterns, and each of the second connection patterns P0*b*", P1*b*", P2*b*", and P3*b*" may further include a reception connection pattern electrically connecting the first reception electrode pattern and the second reception electrode pattern of the second group of reception electrode patterns.

The touch sensor according to another embodiment of the present invention may have an advantage of reducing a resistance value of each connection pattern and a capacitance value between the first connection pattern and the receiving electrode pattern of the second group or between the second connection pattern and the receiving electrode pattern of the first group in comparison with the touch sensor in FIG. 9 according to an embodiment of the present invention.

(a) and (b) of FIG. 13 are views for explaining a different multi-driving of the touch sensor illustrated in FIG. 8.

(a) and (b) of FIG. 13 may simultaneously drive 16 driving electrodes among the plurality of driving electrodes of the touch sensor 100" illustrated in FIG. 8. When the total number of the plurality of driving electrodes is 40, the 40 driving electrodes Tx0, Tx1, . . . , Tx38, and Tx39 may be multi-driven with three touch scans TS1, TS2, and TS3. Since the number of touch scans is reduced, a driving time may be reduced by 40%. Since the driving time is reduced, power consumption may be reduced. Also, a flicker effect may be improved by reducing a driving voltage of the driving signal. As a magnitude of the driving voltage decreases, the flicker effect decreases.

(b) of FIG. 13 shows an example of a driving code of a driving signal applied to each of the 16 driving electrodes Tx0, Tx1, Tx2, Tx3, Tx4, Tx5, Tx6, Tx7, Tx8, Tx9, Tx10, Tx11, Tx12, Tx13, Tx14, and Tx15. In the example of the driving signals shown in (b) of FIG. 13, a sum of codes of the driving signals for each time period in time periods t1 to t16 of each touch scan is '4'.

Here, when it is assumed that the vertical length of the display screen is two times of the horizontal length, although the flicker effect in (a) and (b) of FIG. 13 in a certain time period t1 to t16 is expected to be almost the same as the flicker effect in (a) to (b) of FIG. 3 because the sum of the codes is 4, the touch input device according to another embodiment of the present invention using the different multi-driving method may prevent the flicker from occurring by controlling the multi-driving of the touch sensor 100". Hereinafter, a description will be made with reference to (a) to (t) of FIG. 14.

Figure 14:
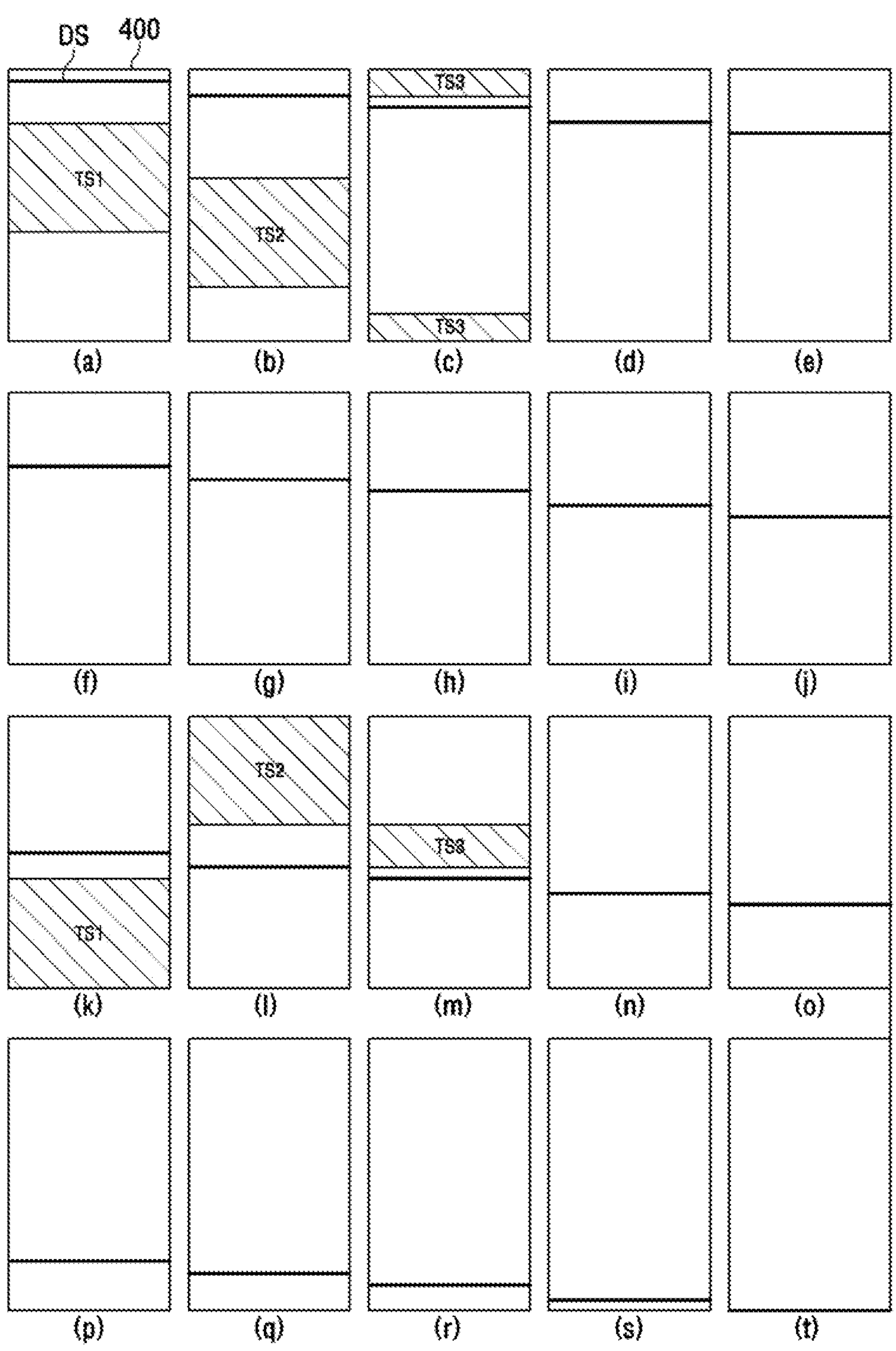
FIG. 14 are views for explaining a mechanism by which a flicker does not occur on a display screen by the multi-driving illustrated in (a) and (b) of FIG. 13.

(a) to (t) of FIG. 14 are views for explaining a mechanism by which a flicker does not occur on a display screen by the multi-driving illustrated in (a) and (b) of FIG. 13.

(a) to (t) of FIG. 14 are views illustrating that a display scan DS moves in the vertical direction on the display screen 400 over time, and three touch scans TS1, TS2, and TS3 are performed on the plurality of driving electrodes arranged in the horizontal direction. Here, (a) to (t) of FIG. 14 assume that the display scan DS is performed at 120 Hz per second and the touch scans TS1, TS2, and TS3 are performed at 240 Hz per second.

Referring to (a) to (c) of FIG. 14, during a time in which the three touch scans TS1, TS2, and TS3 are performed, since areas of all touch scans TS1, TS2, and TS3 and an area of the display scan DS do not overlap each other, the flicker does not occur on any area of the display screen.

Referring to (d) to (j) of FIG. 14, since the touch scan is not performed during this time, the flicker does not occur on the display screen.

Referring to (k) to (m) of FIG. 14, during a time in which the three touch scans TS1, TS2, and TS3 are performed, since areas of all touch scans TS1, TS2, and TS3 and an area of the display scan DS do not overlap each other, the flicker does not occur on any area of the display screen.

Referring to (n) to (t) of FIG. 14, since the touch scan is not performed during this time, the flicker does not occur on the display screen.

The touch scan and the display scan may not overlap each other to perform the multi-driving method as illustrated in (a) to (t) of FIG. 14. To this end, the control unit 300 illustrated in FIG. 8 may simultaneously apply preset driving signals to 16 driving electrodes among the plurality of driving electrodes arranged in the horizontal direction (or minor axis direction) of the touch sensor 100", while controlling the display scan DS not to be performed on one area of the display screen, which overlaps the 16 driving electrodes during a time of applying the driving signal to the 16 driving electrodes. Alternatively, the control unit 300 may control the three touch scans TS1, TS2, and TS3 to be performed on only an area in which the display scan DS is not performed on the display screen.

Figure 15:
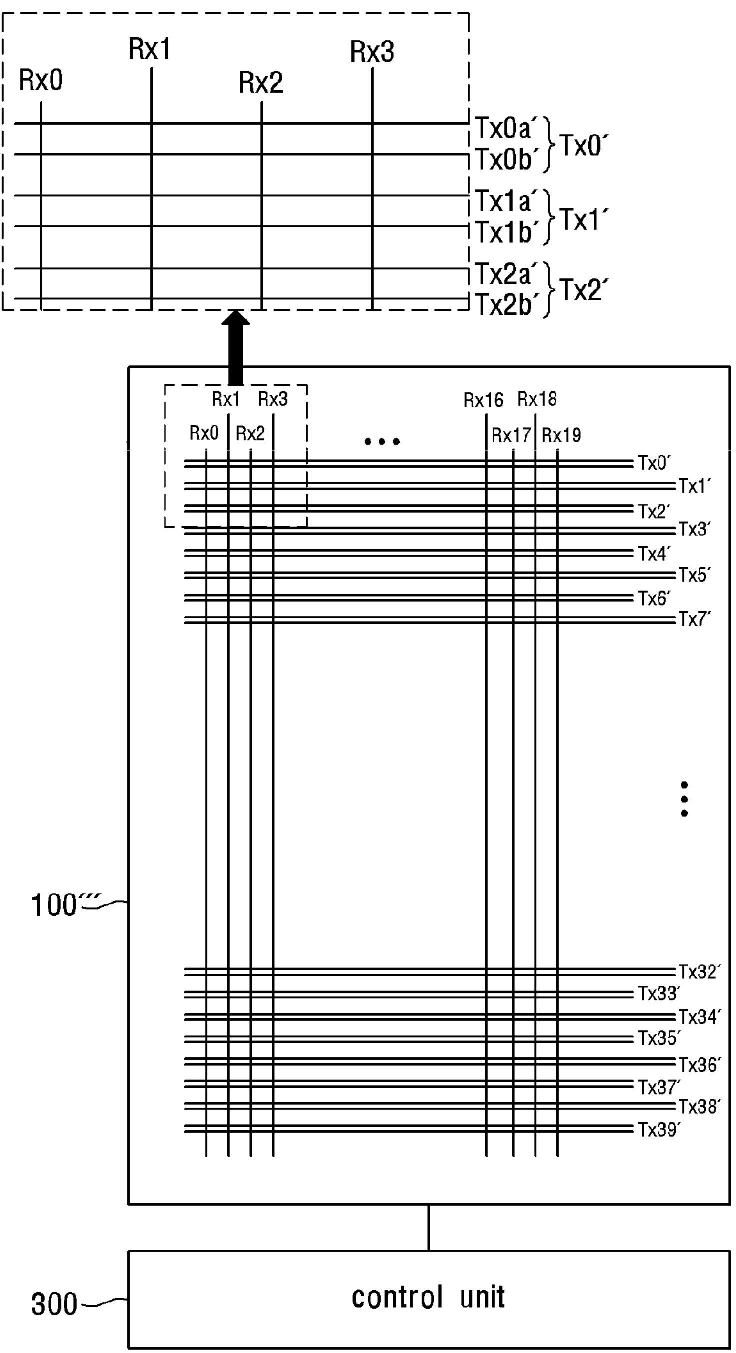
FIG. 15 is a schematic block diagram illustrating a touch input device according to another embodiment of the present invention.

FIG. 15 is a schematic block diagram illustrating a touch input device according to another embodiment of the present invention.

The touch input device illustrated in FIG. 15 according to another embodiment of the present invention is different in a touch sensor 100" from the touch input device illustrated in FIG. 5.

The touch sensor 100" illustrated in FIG. 15 is different in a plurality of driving electrodes Tx0', Tx1', . . . , Tx38', and Tx39' from the touch sensor 100' illustrated in FIG. 5. Specifically, each of the plurality of driving electrodes Tx0', Tx1', . . . , Tx38', and Tx39' includes first electrodes Tx0*a*, Tx1*a*, Tx2*a*, Tx3*a*, . . . and second receiving electrodes Tx0*b*, Tx1*b*, Tx2*b*, Tx3*b* . . . .

The first driving electrodes Tx0*a*, Tx1*a*, Tx2*a*, Tx3*a*, . . . may form the mutual capacitance cm with some receiving electrodes Rx0, Rx2, . . . , Rx16, and Rx18 of the plurality of receiving electrodes Rx0, Rx1, Rx2, . . . , Rx18, and Rx19 and may form little or no mutual capacitance cm with remaining receiving electrodes Rx1, Rx3, . . . , Rx17, and Rx19. Here, the forming of the little mutual capacitance cm may represent a mutual capacitance value that is relatively small compared with the mutual capacitance cm with the some receiving electrodes Rx0, Rx2, . . . , Rx16, and Rx18.

The second driving electrodes Tx0*b*, Tx1*b*, Tx2*b*, Tx3*b*, . . . may form the mutual capacitance cm with the remaining receiving electrodes Rx1, Rx3, . . . , Rx17, and Rx19 of the plurality of receiving electrodes Rx0, Rx1, Rx2, . . . , Rx18, and Rx19 and may form little or no mutual capacitance cm with the some receiving electrodes Rx0, Rx2, . . . , Rx16, and Rx18. Here, the forming of the little mutual capacitance cm may represent a mutual capacitance value that is relatively small compared with the mutual capacitance cm with the remaining receiving electrodes Rx1, Rx3, . . . , Rx17, and Rx19.

The first driving electrodes Tx0*a*, Tx1*a*, Tx2*a*, Tx3*a*, . . . may be disposed directly adjacent to some receiving electrodes Rx0, Rx2, . . . , Rx16, and Rx18 of the plurality of receiving electrodes Rx0, Rx1, Rx2, . . . , Rx18, and Rx19 and spaced a predetermined distance from the remaining receiving electrodes Rx1, Rx3, . . . , Rx17, and Rx19 instead of being directly adjacent thereto. Here, at least one different electrode may be disposed between the first driving electrodes Tx0*a*, Tx1*a*, Tx2*a*, Tx3*a*, . . . and the remaining receiving electrodes Rx1, Rx3, . . . , Rx17, and Rx19. The different electrode may be at least one of the some receiving electrodes Rx0, Rx2, . . . , Rx16, and Rx18.

The second driving electrodes Tx0*b*, Tx1*b*, Tx2*b*, Tx3*b*, . . . may be disposed directly adjacent to the remaining receiving electrodes Rx1, Rx3, . . . , Rx17, and Rx19 of the plurality of receiving electrodes Rx0, Rx1, Rx2, . . . , Rx18, and Rx19 and spaced a predetermined distance from the sine receiving electrodes Rx0, Rx2, . . . , Rx16, and Rx18 instead of being directly adjacent thereto. Here, at least one different electrode may be disposed between the second driving electrodes Tx0*b*, Tx1*b*, Tx2*b*, Tx3*b*, . . . and the some receiving electrodes Rx0, Rx2, . . . , Rx16, and Rx18. The different electrode may be at least one of the remaining receiving electrodes Rx1, Rx3, . . . , Rx17, and Rx19.

In each of the driving electrode Tx0', Tx1', . . . , Tx38', and Tx39', the second driving signal applied to the second driving electrode Tx0*b*, Tx1*b*, Tx2*b*, Tx3*b*, . . . is obtained by shifting the first driving signal applied to the first driving electrodes Tx0*a*, Tx1*a*, Tx2*a*, Tx3*a*, . . . by 180°.

When a multi-driving signal is applied to some driving electrodes of the plurality of driving electrodes Tx0', Tx1', . . . , Tx38', and Tx39' by the control unit 300, a signal is output from each of the receiving electrode Rx0, Rx1, Rx2, Rx3, . . . . The output signal may include a difference value between an amount of variation in capacitance of one of the first driving electrode and the second driving electrode, which is directly adjacent to the corresponding receiving electrode and an amount of variation in capacitance of the other that is not directly adjacent to the corresponding receiving electrode.

The control unit 300 may detect a touch position based on the output signal. Here, from the output signal, information on an amount of variation in mutual capacitance caused by an object, a display noise (e.g., Zebra noise), an amount of variation caused by image change, a LGM noise in a floating state, and a cathode re-transmission phenomenon (as a size of a resistance RELVSS of an ELVSS layer increases (i.e., as a GND decreases), a high-frequency signal is also transmitted to the receiving electrode of the touch sensor and added to a main signal) are canceled out.

Thus, the output signal may include only information on the amount of variation in mutual capacitance caused by the object. The control unit 300 may process the output signal to determine the touch position.

The plurality of driving electrodes Tx0, Tx1, Tx2, . . . , Tx and the plurality of receiving electrodes Rx0, Rx1, Rx2, . . . may be arranged together on the same layer (1 layer), or may be disposed respectively in different double layers (2 layers). Alternatively, some of the plurality of driving electrodes Tx0', Tx1', Tx2', . . . may be disposed on a different layer from the others, and some of the plurality of receiving electrodes Rx0, Rx1, Rx2, . . . may be disposed on a different layer from the others. The plurality of driving electrodes Tx0', Tx1', Tx2', . . . and the plurality of receiving electrodes Rx0, Rx1, Rx2, . . . may each have a diamond pattern, circular, oval or polygonal shape.

The plurality of driving electrodes Tx0', Tx1', Tx2', . . . and the plurality of receiving electrodes Rx0, Rx1, Rx2, . . . may be made of a metal mesh and patterned on a thin film encapsulation (TFE) layer of the display panel.

The touch sensor 100''' illustrated in FIG. 15 may be realized by replacing the receiving electrodes RX0, RX1, RX2, RX3, and RX4 with the driving electrodes TX0, TX1, TX2, TX3, and TX4, and, on the contrary, replacing the driving electrodes TX0, TX1, TX2, TX3, and TX4 with the receiving electrodes RX0, RX1, RX2, RX3, and RX4 in the touch sensors 100'' illustrated in FIGS. 9 to 12.

The touch input device illustrated in FIG. 15 may perform the multi-driving as in (a) and (b) of FIG. 6 and prevent the flicker from occurring by controlling the multi-driving of the touch sensor 100'' as in (a) to (t) of FIG. 7 because the plurality of driving electrodes of the touch sensor 100'' are arranged in the same direction as the scan line of the display panel.

Figure 16:
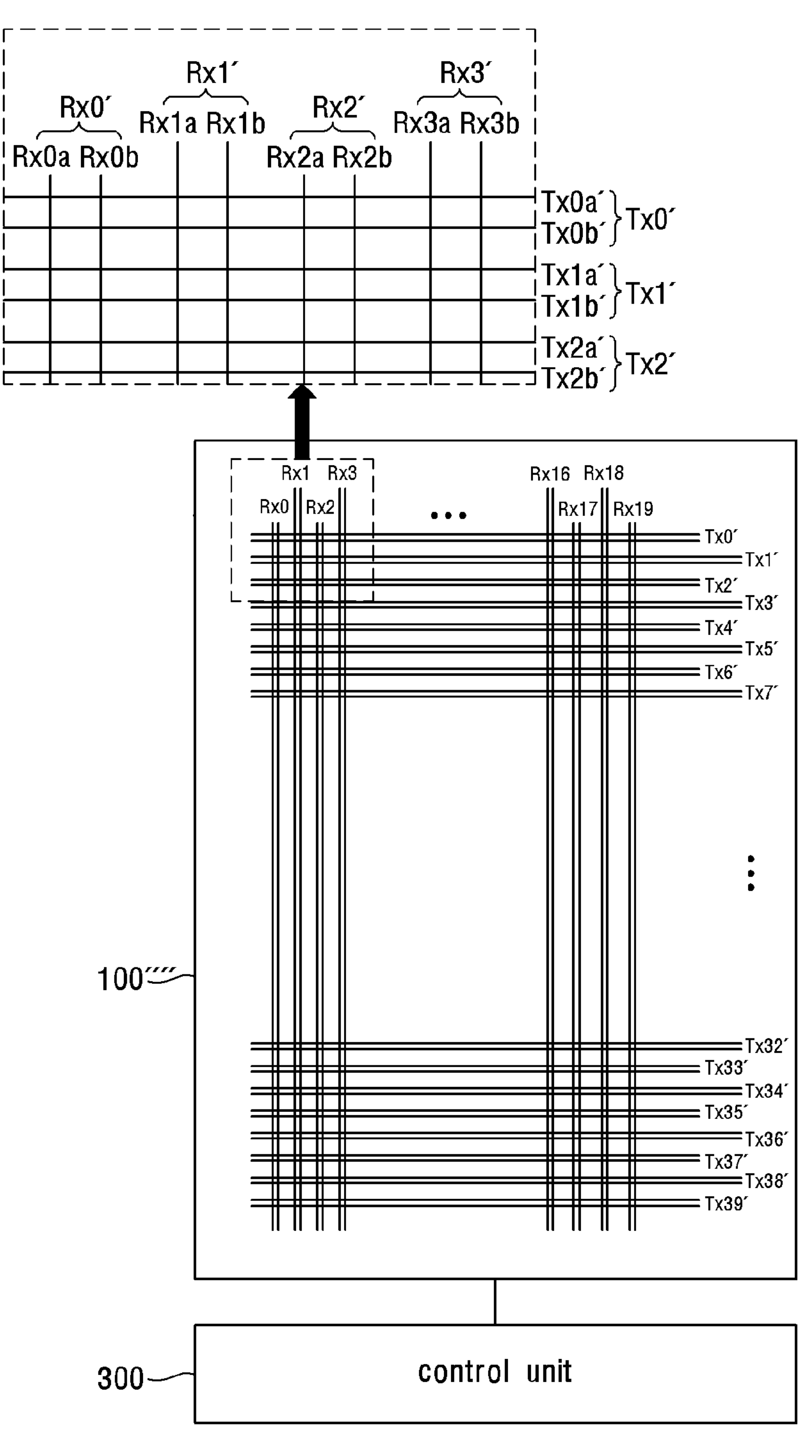
FIG. 16 is a schematic block diagram illustrating a touch input device according to another embodiment of the present invention.

FIG. 16 is a schematic block diagram illustrating a touch input device according to another embodiment of the present invention.

The touch input device illustrated in FIG. 16 according to another embodiment of the present invention is different in a touch sensor 100'' from the touch input device illustrated in FIG. 5.

The touch sensor 100'' illustrated in FIG. 16 includes the plurality of receiving electrodes Rx0', Rx1', Rx2', . . . , Rx18', and Rx19' illustrated in FIG. 8 and the plurality of driving electrodes Tx0', Tx1', Tx2', . . . , Tx38', and Tx39' illustrated in FIG. 15.

The touch input device including the touch sensor 100'' may perform the multi-driving as in (a) and (b) of FIG. 6 and prevent the flicker from occurring by controlling the multi-driving of the touch sensor 100'''' as in (a) to (t) of FIG. 7 because the plurality of driving electrodes of the touch sensor 100'''' are arranged in the same direction as the scan line of the display panel.

Figure 17:
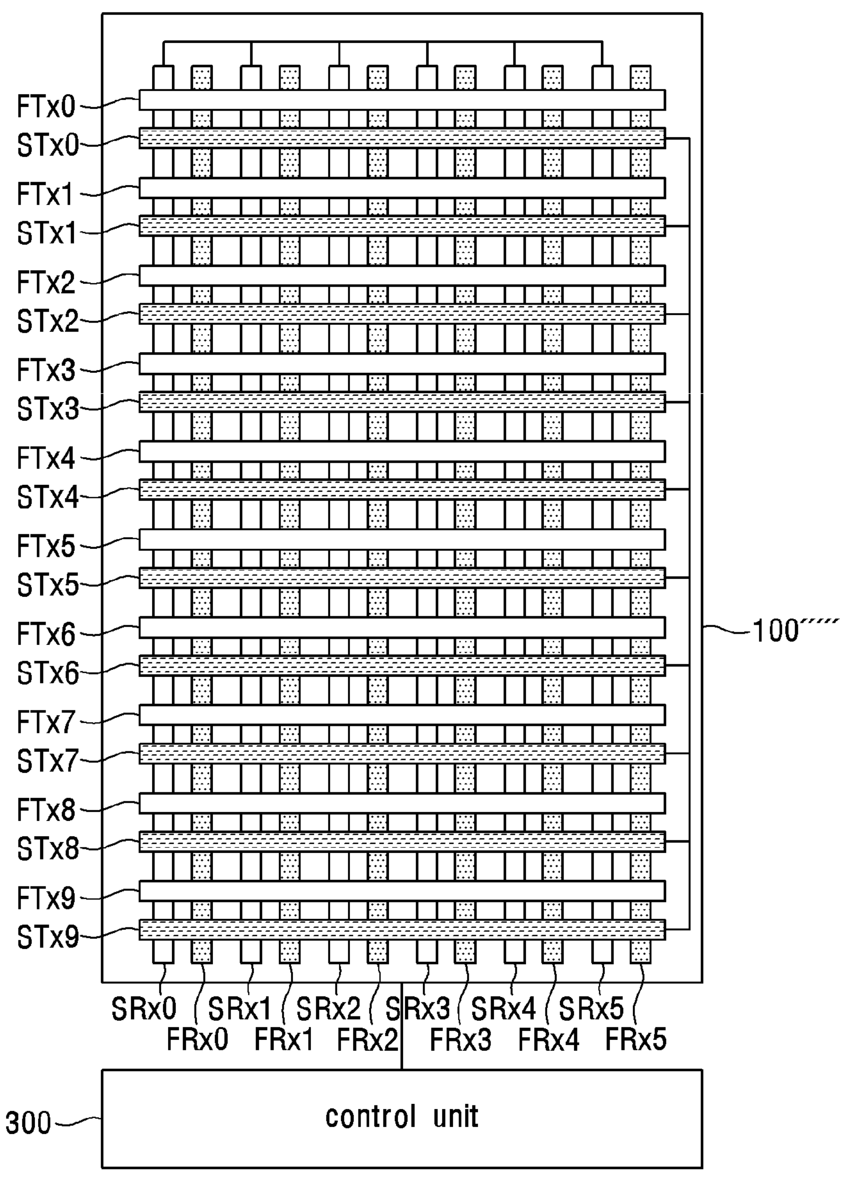
FIG. 17 is a schematic block diagram illustrating a touch input device according to another embodiment of the present invention.

FIG. 17 is a schematic block diagram illustrating a touch input device according to another embodiment of the present invention.

The touch input device illustrated in FIG. 17 according to another embodiment of the present invention is different in a touch sensor 100'''' from the touch input device illustrated in FIG. 5.

The touch input device including the touch sensor 100'''' and the control unit 300 may detect a position of an object such as a finger disposed on a screen, output a driving signal for driving a stylus pen, and detect a position of the stylus pen disposed on the screen by detecting a signal output from the stylus pen.

The touch sensor 100'''' includes a plurality of touch driving electrodes FTx0, FTx1, . . . , FTx8, and FTx9, a plurality of pen driving electrodes STx0, STx1, . . . , STx8, and STx9, a plurality of touch receiving electrodes FRx0, FRx1, . . . , FRx4, and FRx5, and a plurality of pen receiving electrodes SRx0, SRx1, . . . , SRx4, and SRx5.

Each of the touch driving electrodes FTx0, FTx1, . . . , FTx8, and FTx9 is arranged in the same direction as a scan line of a display panel (not shown). Here, the same direction as the scan line may be a minor axis direction of the touch input device. Each of the touch driving electrodes FTx0, FTx1, . . . , FTx8, and Ftx9 applies a touch driving signal for sensing an object such as a finger or a conductive member.

Each of the pen driving electrodes STx0, STx1, . . . , STx8, and Stx9 is disposed adjacent to the touch driving electrodes FTx0, FTx1, . . . , FTx8, and Ftx9 or spaced a predetermined distance from the touch driving electrodes FTx0, FTx1, . . . , FTx8, and Ftx9. Each of the touch driving electrodes STx0, STx1, . . . , STx8, and STx9 is arranged in the same direction as the scan line of the display panel (not shown). Each of the pen driving electrodes STx0, STx1, . . . , STx8, and Stx9 may apply the pen driving signal for driving the stylus pen or detect a pen signal from the stylus pen.

One ends of the pen driving electrodes STx0, STx1, . . . , STx8, and Stx9 may be electrically connected to each other through a conductive pattern. Here, the conductive pattern may be a metal mesh or a silver trace.

Each of the touch receiving electrodes FRx0, FRx1, . . . , FRx4, and Frx5 is arranged in a direction different from the direction in which each of the touch driving electrodes FTx0, FTx1, . . . , FTx8, and FTx9 is arranged. Each of the touch driving electrodes FRx0, FRx1, . . . , FRx4, and FRx5 outputs a touch sensing signal for sensing an object such as a finger or a conductive member.

Each of the pen receiving electrodes SRx0, SRx1, . . . , SRx4, and SRx5 is disposed adjacent to the touch receiving electrodes FRx0, FRx1, . . . , FRx4, and FRx5 or spaced a predetermined distance from the touch receiving electrodes FRx0, FRx1, . . . , FRx4, and FRx5. Each of the pen receiving electrodes SRx0, SRx1, . . . , SRx4, and SRx5 is arranged in a direction different from the direction in which each of the pen driving electrodes STx0, STx1, . . . , STx8, and STx9 is arranged. Each of the pen receiving electrodes SRx0, SRx1, . . . , SRx4, and Stx9 may apply the pen driving signal for driving the stylus pen or detect the pen signal from the stylus pen.

One ends of the pen receiving electrodes SRx0, SRx1, . . . , SRx4, and Stx5 may be electrically connected to each other through a conductive pattern. Here, the conductive pattern may be a metal mesh or a silver trace.

The plurality of touch receiving electrodes FRx0, FRx1, . . . , FRx4, and FRx5 and the plurality of pen receiving electrodes SRx0, SRx1, . . . , SRx4, and SRx5 may be disposed on the plurality of touch driving electrodes FTx0, FTx1, . . . , FTx8, and FTx9 and the plurality of pen driving electrodes STx0, STx1, . . . , STx8, and STx9 or spaced a predetermined distance from the plurality of touch driving electrodes FTx0, FTx1, . . . , FTx8, and FTx9 and the plurality of pen driving electrodes STx0, STx1, . . . , STx8, and STx9.

The number of the plurality of touch driving electrodes FTx0, FTx1, . . . , FTx8, and FTx9 and the number of the plurality of touch receiving electrodes FRx0, FRx1, . . . , FRx4, and FRx5 may increase or decrease depending on relative lengths of the major axis and the minor axis and a size of the screen of the touch input device.

The plurality of touch driving electrodes FTx0, FTx1, . . . , FTx8, and FTx9 and the plurality of touch receiving electrodes FRx0, FRx1, . . . , FRx4, and FRx5 basically sense the touch of the object such as a finger and a conductive member. To this end, the plurality of touch driving electrodes FTx0, FTx1, . . . , FTx8, and FTx9 may operate as the touch driving electrode to which the touch driving signal is applied, and the plurality of touch receiving electrodes FRx0, FRx1, . . . , FRx4, and FRx5 may operate as the touch sensing electrode (or touch receiving electrode) by which the touch sensing signal is received. Alternatively, this may work in the opposite manner.

The touch sensor 100"" of the touch input device illustrated in FIG. 17 may drive and sense the stylus pen by using various combinations of the plurality of touch driving electrodes FTx0, FTx1, . . . , FTx8, and FTx9, the plurality of pen driving electrodes STx0, STx1, . . . , STx8, and STx9, the plurality of touch receiving electrodes FRx0, FRx1, . . . , FRx4, and FRx5, and the plurality of pen receiving electrodes SRx0, SRx1, . . . , SRx4, and SRx5. The various combinations are shown in <Table 1> below. In the <Table 1> below, '1' refers to the plurality of touch driving electrodes FTx0, FTx1, . . . , FTx8, and FTx9, '2' refers to the plurality of pen driving electrodes STx0, STx1, . . . , STx8, and STx9, '3' refers to the plurality of touch receiving electrodes FRx0, FRx1, . . . , FRx4, and FRx5, and '4' refers to the plurality of pen receiving electrodes SRx0, SRx1, . . . , SRx4, and SRx5.

TABLE 1

| | Finger Touch Operation | | Stylus Operation | | | | Magnitude of uplink signal | | Magnitude of downlink signal | | Stylus additional channel | |
|---|---|---|---|---|---|---|---|---|---|---|---|---|
| | | | Driving | | Sensing | | | | | | | |
| No. | Driving TX | Sensing RX | Major axis | Minor axis | X-axis | Y-axis | Major axis | Minor axis | X-axis | Y-axis | Driving | Sensing |
| 1 | 1 | 3 | 2 | | 1 | 3 | Small | | Small | Small | Yes | No |
| 2 | 1 | 3 | 2 | | 1 | 4 | Large | | Small | Large | Yes | Yes |
| 3 | 1 | 3 | 2 | | 2 | 3 | Large | | Large | Small | Yes | Yes |
| 4 | 1 | 3 | 2 | | 2 | 4 | Large | | Large | Large | Yes | Yes |
| 5 | 1 | 3 | | 4 | 1 | 3 | | Large | Small | Small | Yes | No |
| 6 | 1 | 3 | | 4 | 1 | 4 | | Large | Small | Large | Yes | Yes |
| 7 | 1 | 3 | | 4 | 2 | 3 | | Large | Large | Small | Yes | Yes |
| 8 | 1 | 3 | | 4 | 2 | 4 | | Large | Large | Large | Yes | Yes |
| 9 | 1 | 3 | 2 | 4 | 1 | 3 | Large | Large | Small | Small | Yes | No |
| 10 | 1 | 3 | 2 | 4 | 1 | 4 | Large | Large | Small | Large | Yes | Yes |
| 11 | 1 | 3 | 2 | 4 | 2 | 3 | Large | Large | Large | Small | Yes | Yes |
| 12 | 1 | 3 | 2 | 4 | 2 | 4 | Large | Large | Large | Large | Yes | Yes |
| 13 | 1 | 3 | 1 | | 1 | 3 | Small | | Small | Small | No | No |
| 14 | 1 | 3 | 1 | | 1 | 4 | Small | | Small | Large | No | Yes |
| 15 | 1 | 3 | 1 | | 2 | 3 | Small | | Large | Small | No | Yes |
| 16 | 1 | 3 | 1 | | 2 | 4 | Small | | Large | Large | No | Yes |
| 17 | 1 | 3 | | 3 | 1 | 3 | | Small | Small | Small | No | No |
| 18 | 1 | 3 | | 3 | 1 | 4 | | Small | Small | Large | No | Yes |
| 19 | 1 | 3 | | 3 | 2 | 3 | | Small | Large | Small | No | Yes |
| 20 | 1 | 3 | | 3 | 2 | 4 | | Small | Large | Large | No | Yes |
| 21 | 1 | 3 | 1 | 3 | 1 | 3 | Small | Small | Small | Small | No | No |
| 22 | 1 | 3 | 1 | 3 | 1 | 4 | Small | Small | Small | Large | No | Yes |
| 23 | 1 | 3 | 1 | 3 | 2 | 3 | Small | Small | Large | Small | No | Yes |
| 24 | 1 | 3 | 1 | 3 | 2 | 4 | Small | Small | Large | Large | No | Yes |
| 25 | 1 | 3 | 2 | 3 | 1 | 3 | Large | Small | Small | Small | Yes | No |
| 26 | 1 | 3 | 2 | 3 | 1 | 4 | Large | Small | Small | Large | Yes | Yes |
| 27 | 1 | 3 | 2 | 3 | 2 | 3 | Large | Small | Large | Small | Yes | Yes |
| 28 | 1 | 3 | 2 | 3 | 2 | 4 | Large | Small | Large | Large | Yes | Yes |
| 29 | 1 | 3 | 1 | 4 | 1 | 3 | Small | Large | Small | Small | Yes | No |
| 30 | 1 | 3 | 1 | 4 | 1 | 4 | Small | Large | Small | Large | Yes | Yes |
| 31 | 1 | 3 | 1 | 4 | 2 | 3 | Small | Large | Large | Small | Yes | Yes |
| 32 | 1 | 3 | 1 | 4 | 2 | 4 | Small | Large | Large | Large | Yes | Yes |

Referring to <Table 1> above, in various combinations No. 1 to No. 32, the plurality of touch driving electrodes FTx0, FTx1, . . . , FTx8, and FTx9 and the plurality of touch receiving electrodes FRx0, FRx1, . . . , FRx4, and FRx5 sense the touch of the object such as a finger.

One or two of the plurality of touch driving electrodes FTx0, FTx1, . . . , FTx8, and FTx9, the plurality of pen driving electrodes STx0, STx1, . . . , STx8, and STx9, the plurality of touch receiving electrodes FRx0, FRx1, . . . , FRx4, and FRx5, and the plurality of pen receiving electrodes SRx0, SRx1, . . . , SRx4, and SRx5 may operate as a stylus driving electrode for driving the stylus pen. A current loop for driving the stylus pen may be formed by using a pattern of one or two of the plurality of touch driving electrodes FTx0, FTx1, . . . , FTx8, and FTx9, the plurality of pen driving electrodes STx0, STx1, . . . , STx8, and STx9, the plurality of touch receiving electrodes FRx0, FRx1, . . . , FRx4, and FRx5, and the plurality of pen receiving electrodes SRx0, SRx1, . . . , SRx4, and SRx5. An X-axis driving may be one kind of electrodes of the plurality of touch driving electrodes FTx0, FTx1, . . . , FTx8, and FTx9 and the plurality of pen driving electrodes STx0, STx1, . . . , STx8, and Stx9, and a Y-axis driving may be one kind of electrodes of the plurality of touch receiving electrodes FRx0, FRx1, . . . , FRx4, and FRx5 and the plurality of pen receiving electrodes SRx0, SRx1, . . . , SRx4, and SRx5. The driving of the stylus pen may be performed by either the X-axis driving or the Y-axis driving or by both the X-axis driving and the Y-axis driving.

Two of the plurality of touch driving electrodes FTx0, FTx1, . . . , FTx8, and FTx9, the plurality of pen driving electrodes STx0, STx1, . . . , STx8, and STx9, the plurality of touch receiving electrodes FRx0, FRx1, . . . , FRx4, and FRx5, and the plurality of pen receiving electrodes SRx0, SRx1, . . . , SRx4, and SRx5 may operate as a sensing electrode for sensing the stylus pen. Since all of X-axis sensing and Y-axis sensing are required to sense the stylus pen signal, two patterns of the plurality of touch driving electrodes FTx0, FTx1, . . . , FTx8, and FTx9, the plurality of pen driving electrodes STx0, STx1, . . . , STx8, and STx9, the plurality of touch receiving electrodes FRx0, FRx1, . . . , FRx4, and FRx5, and the plurality of pen receiving electrodes SRx0, SRx1, . . . , SRx4, and SRx5 are used. The X-axis driving may be one kind of electrodes of the plurality of touch driving electrodes FTx0, FTx1, . . . , FTx8, and FTx9 and the plurality of pen driving electrodes STx0, STx1, . . . , STx8, and Stx9, and the Y-axis driving may be one kind of electrodes of the plurality of touch receiving electrodes FRx0, FRx1, . . . , FRx4, and FRx5 and the plurality of pen receiving electrodes SRx0, SRx1, . . . , SRx4, and SRx5.

In the <Table 1> above, the 'magnitude of uplink signal' represents a magnitude of the driving signal for driving the stylus pen. The 'magnitude of downlink signal' represents a magnitude of the stylus pen signal received from the stylus pen. The 'stylus additional channel' represents whether an additional channel is necessary for the stylus pen in addition to the touch sensing.

The touch input device illustrated in FIG. 17 may perform the multi-driving as in (a) and (b) of FIG. 6 and prevent the flicker from occurring by controlling the multi-driving of the touch sensor 100"" as in (a) to (t) of FIG. 7 because the plurality of driving electrodes FTx0, FTx1, . . . , FTx8, and FTx9 of the touch sensor 100"" are arranged in the same direction as the scan line of the display panel.

Figure 18:
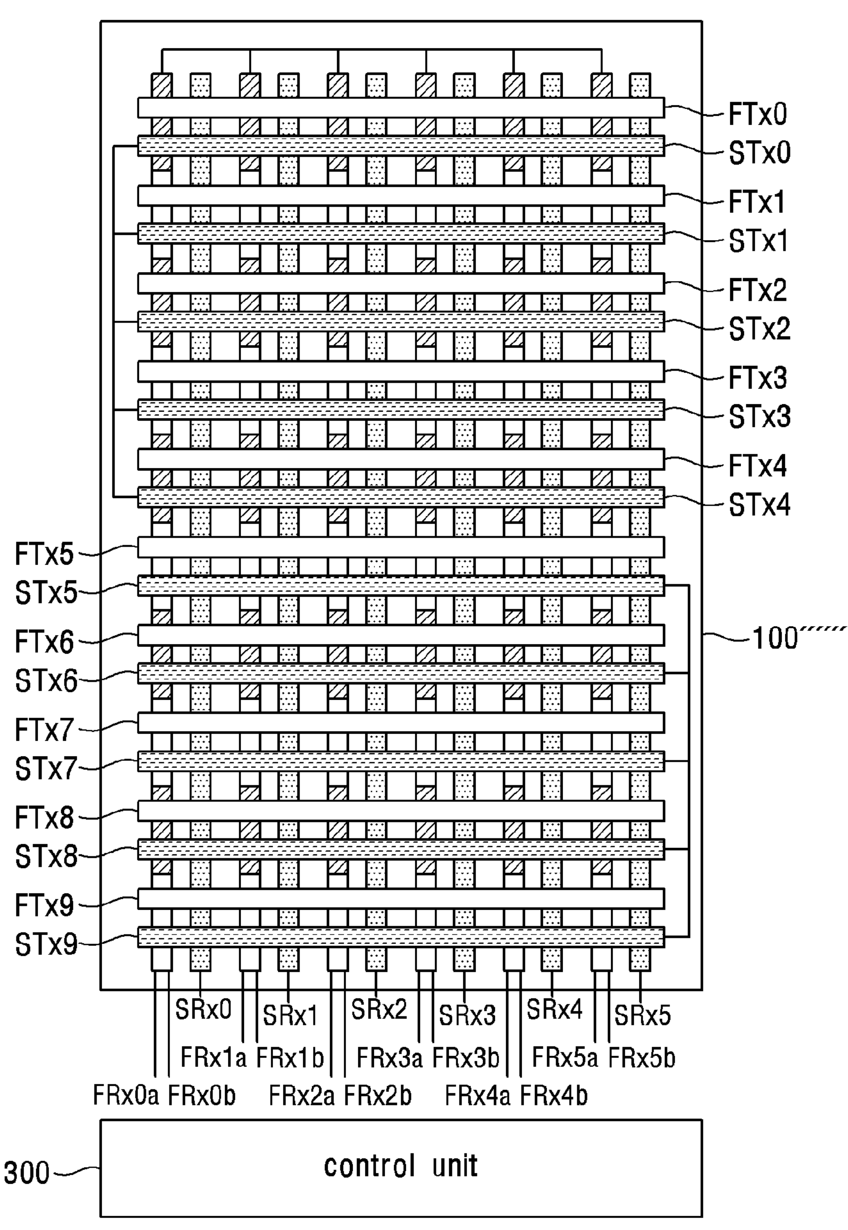
FIG. 18 is a schematic block diagram illustrating a touch input device according to another embodiment of the present invention.

FIG. 18 is a schematic block diagram illustrating a touch input device according to another embodiment of the present invention.

The touch input device illustrated in FIG. 18 according to another embodiment of the present invention is different in a touch sensor 100""" from the touch input device illustrated in FIG. 5.

The touch sensor 100""" illustrated in FIG. 18 is the same as the touch sensor 100"" illustrated in FIG. 17 except for a plurality of touch receiving electrodes.

Each of the plurality of touch receiving electrodes of the touch sensor 100""" illustrated in FIG. 18 includes a pair of first receiving electrodes FRx0*a*, FRx1*a*, . . . , FRx5*a* and second receiving electrodes FRx0*b*, FRx1*b*, . . . , FRx5*b*.

The first receiving electrodes FRx0*a*, FRx1*a*, . . . , FRx5*a* and the second receiving electrodes FRx0*b*, FRx1*b*, . . . , FRx5*b* may be alternately arranged in a direction different from an arrangement direction of the scan line of the display panel (not shown), e.g., a direction perpendicular to the arrangement direction of the scan line.

The first receiving electrodes FRx0*a*, FRx1*a*, . . . , FRx5*a* may form a mutual capacitance with some driving electrodes FTx0, FTx2, FTx4, FTx6, and FTx8 of the plurality of touch driving electrodes FTx0, FTx1, . . . , FTx8, and FTx9 or be disposed directly adjacent thereto, or form little mutual capacitance with remaining driving electrodes FTx1, FTx3, FTx5, FTx7, and FTx9 or be spaced apart therefrom.

The second receiving electrodes FRx0*b*, FRx1*b*, . . . , FRx5*b* may form a mutual capacitance with the remaining driving electrodes FTx1, FTx3, FTx5, FTx7, and FTx9 of the plurality of touch driving electrodes FTx0, FTx1, . . . , FTx8, and FTx9 or be disposed directly adjacent thereto, or form little mutual capacitance with the some driving electrodes FTx0, FTx2, FTx4, FTx6, and FTx8 or be spaced apart therefrom.

The touch input device illustrated in FIG. 18 has an advantage of removing the noise (the display noise and the LGM noise) when detecting a touch position to improve touch position sensing sensitivity by differentially amplifying the sensing signals output from the pair of receiving electrodes of each touch receiving electrode when sensing a touch.

Also, the touch input device illustrated in FIG. 18 may perform the multi-driving as in (a) and (b) of FIG. 6 and prevent the flicker from occurring by controlling the multi-driving of the touch sensor 100""" as in (a) to (t) of FIG. 7 because the plurality of driving electrodes FTx0, FTx1, . . . , FTx8, and FTx9 of the touch sensor 100""" are arranged in the same direction as the scan line of the display panel.

Figure 19:
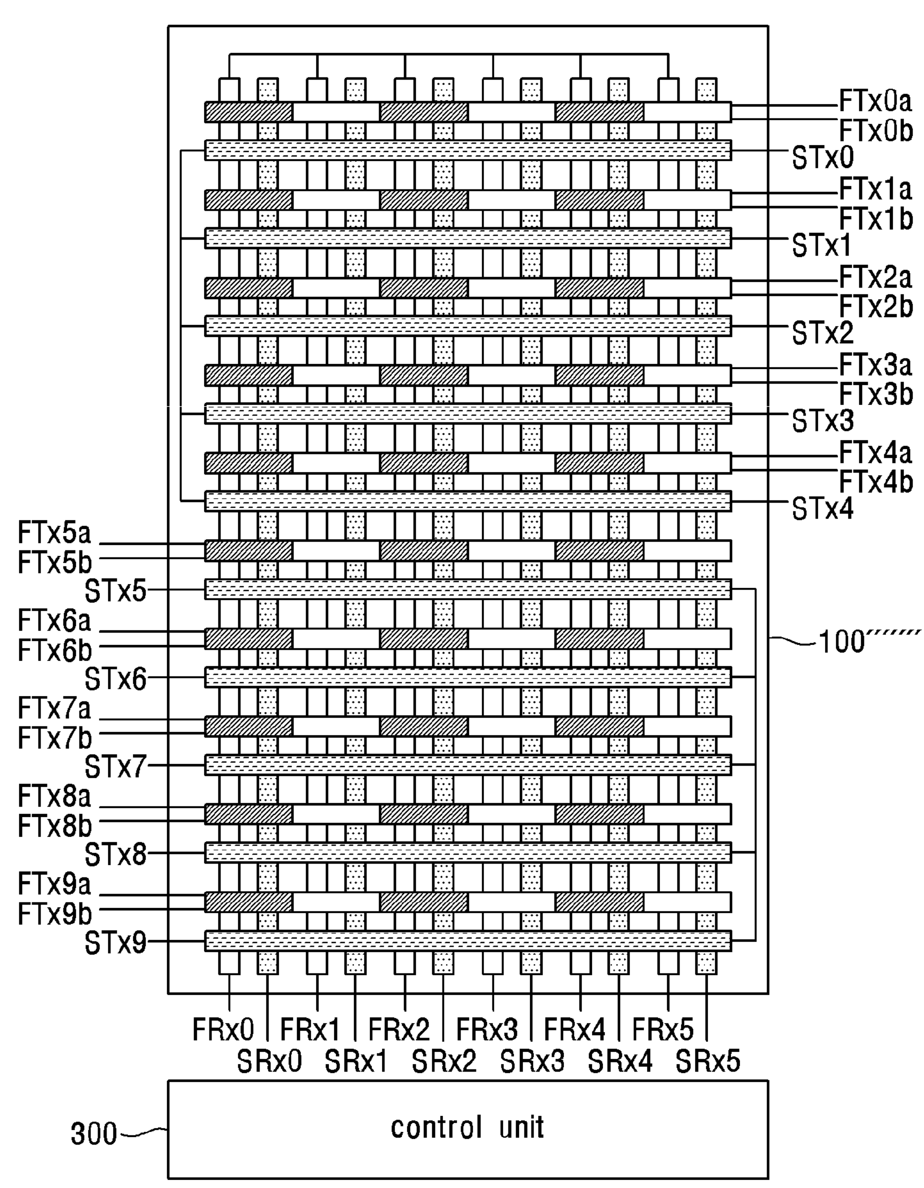
FIG. 19 is a schematic block diagram illustrating a touch input device according to another embodiment of the present invention.

FIG. 19 is a schematic block diagram illustrating a touch input device according to another embodiment of the present invention.

The touch input device illustrated in FIG. 19 according to another embodiment of the present invention is different in a touch sensor 100""" from the touch input device illustrated in FIG. 5.

The touch sensor 100""" illustrated in FIG. 19 is the same as the touch sensor 100"" illustrated in FIG. 17 except for a plurality of touch receiving electrodes.

Each of the plurality of touch receiving electrodes of the touch sensor 100""" illustrated in FIG. 19 includes a pair of first receiving electrodes FTx0*a*, FTx1*a*, . . . , FTx9*a* and second receiving electrodes FTx0*b*, FTx1*b*, . . . , FTx9*b*.

The first receiving electrodes FTx0*a*, FTx1*a*, . . . , FTx9*a* and the second receiving electrodes FTx0*b*, FTx1*b*, . . . , FTx9*b* may be alternately arranged in the same direction as an arrangement direction of the scan line of the display panel (not shown), e.g., a direction parallel to the arrangement direction of the scan line.

The first receiving electrodes FTx0*a*, FTx1*a*, . . . , FTx9*a* may form a mutual capacitance with some receiving electrodes FRx0, FRx2, and FRx4 of the plurality of touch driving electrodes FRx0, FRx1, . . . , FRx4, and FRx5 or be disposed directly adjacent thereto, or form little mutual capacitance with remaining receiving electrodes FRx1, FRx3, and FRx5 or be spaced apart therefrom.

The second receiving electrodes FTx0*b*, FTx1*b*, . . . , FTx9*b* may form a mutual capacitance with the remaining receiving electrodes FRx1, FRx3, and FRx5 of the plurality of receiving electrodes FTx0, FTx1, . . . , FRx4, and FRx5 or be disposed directly adjacent thereto, or form little mutual capacitance with the some driving electrodes FRx0, FRx2, and FRx4 or be spaced apart therefrom.

A first driving signal and a second driving signal may be simultaneously or sequentially applied to the pair of first and second driving electrodes of each touch driving electrode, respectively. Here, each of the first driving signal and the second driving signal may be a pulse signal or a sine signal having a phase shifted by 180°.

The touch input device illustrated in FIG. 19 may exhibit the technical effects described in FIG. 15 because each of the plurality of touch driving electrodes includes the pair of first and second driving electrodes illustrated in FIG. 15, and the first and second driving signals that are simultaneously applied to the first and second driving electrodes have phases shifted from each other by 180°.

Figure 20:
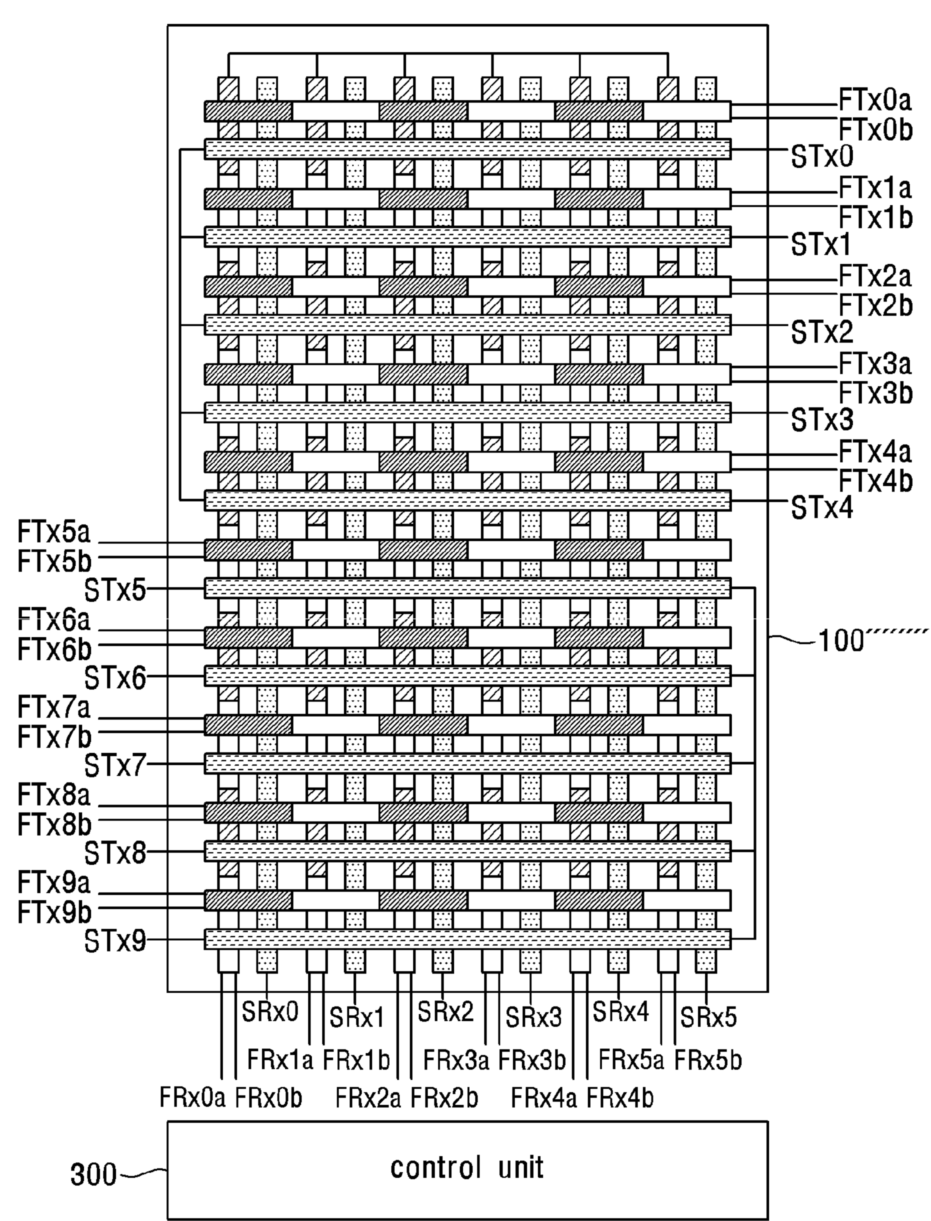
FIG. 20 is a schematic block diagram illustrating a touch input device according to another embodiment of the present invention.

FIG. 20 is a schematic block diagram illustrating a touch input device according to another embodiment of the present invention.

The touch input device illustrated in FIG. 20 according to another embodiment of the present invention is different in a touch sensor 100"""" from the touch input device illustrated in FIG. 5.

The touch sensor 100""""" illustrated in FIG. 20 is different in a plurality of touch driving electrodes and a plurality of touch receiving electrodes from the touch sensor 100"" illustrated in FIG. 17.

Each of the plurality of touch receiving electrodes of the touch sensor 100"""" illustrated in FIG. 20 includes a pair of first receiving electrodes FRx0*a*, FRx1*a*, . . . , FRx5*a* and second receiving electrodes FRx0*b*, FRx1*b*, . . . , FRx5*b*. Each of the plurality of touch receiving electrodes of the touch sensor 100"""" illustrated in FIG. 19 includes a pair of first driving electrodes FTx0*a*, FTx1*a*, . . . , FTx9*a* and second driving electrodes FTx0*b*, FTx1*b*, . . . , FTx9*b*.

The touch input device illustrated in FIG. 20 may exhibit the technical effects of the touch input device described in FIGS. 18 and 19 because all features described in FIGS. 18 and 19 are applied to the plurality of touch driving electrodes and the plurality of receiving electrodes.

The flicker occurring on the display panel caused by the multi-driving of the touch sensor may be prevented by using the touch input device according to the embodiment of the present invention.

Also, the power consumption may be reduced by decreasing the touch driving time.

Also, the touch malfunction in the LGM state may be prevented.

Features, structures, and effects described in the above embodiments are incorporated into at least one embodiment of the present disclosure, but are not limited to only one embodiment. Moreover, features, structures, and effects exemplified in one embodiment can easily be combined and modified for another embodiment by those skilled in the art. Therefore, these combinations and modifications should be construed as falling within the scope of the present disclosure. Moreover, features, structures, and effects exemplified in one embodiment can easily be combined and modified for another embodiment by those skilled in the art. Therefore, these combinations and modifications should be construed as falling within the scope of the present invention.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch input device comprising:

a display panel having a plurality of scan lines;

a touch sensor comprising a plurality of driving electrodes arranged in the same direction as the scan line and a plurality of receiving electrodes arranged in a direction different from the scan line; and a control unit configured to perform a touch scan so that driving signals are applied to two or more driving electrodes of the plurality of driving electrodes, wherein the control unit controls a driving timing of the touch scan so that the scan line to which a display scan signal is applied of the plurality of scan lines and the driving electrodes to which the driving signals are applied are not in overlap with each other in terms of time and space;

wherein at least one receiving electrode among the plurality of receiving electrodes includes the plurality of receiving electrode patterns and a plurality of connection patterns, wherein the plurality of receiving electrode patterns include receiving electrode patterns of one group and receiving electrode patterns of the other group, which are electrically separated from each other, wherein the receiving electrode patterns of the one group and the receiving electrode patterns of the other group are alternately arranged, and wherein the plurality of connection patterns of the at least one receiving electrode comprise first connection patterns configured to electrically connect the receiving electrode patterns of the one group and second connection patterns configured to electrically connect the receiving electrode patterns of the other group.

2. The touch input device of claim 1, wherein the control unit sequentially performs the touch scan a plurality of times on all of the plurality of driving electrodes.

3. The touch input device of claim 1, wherein each of the driving signals is obtained by continuing a code expressed as either 1 or −1 for each predetermined time period as many as the number of the driving electrodes, and wherein a code value of a sum of the codes of the driving signals for each time period is 4 or 0.

4. The touch input device of claim 1, wherein the touch sensor is disposed in the display panel.

5. The touch input device of claim 1, wherein the touch sensor is disposed on or below the display panel.

6. The touch input device of claim 1, wherein each of the plurality of receiving electrodes comprises a first receiving electrode and a second receiving electrode, and wherein the control unit detects a touch position of an object based on a differential signal obtained by differentiating a first sensing signal from the first receiving electrode and a second sensing signal from the second receiving electrode.

7. The touch input device of claim 6, wherein each of the driving signals is obtained by continuing a code expressed as either 1 or −1 for each predetermined time period as many as the number of the driving electrodes, and a code value of a sum of the codes of the driving signals for each time period is 4.

8. The touch input device of claim 1, wherein a first sensing signal is output through the first connection patterns, and a second sensing signal is output through the second connection patterns.

9. The touch input device of claim 1, wherein a portion of the driving electrode directly adjacent to a periphery of the receiving electrode pattern of the one group and a portion of the driving electrode directly adjacent to a periphery of the receiving electrode pattern of the other group are disposed together between the receiving electrode pattern of the one group and the receiving electrode pattern of the other group, which are disposed adjacent to each other.

10. The touch input device of claim 1, wherein the driving electrode disposed directly adjacent to a periphery of the receiving electrode pattern of the other group is separated from the receiving electrode pattern of the one group by the driving electrode disposed directly adjacent to a periphery of the receiving electrode pattern of the one group.

11. The touch input device of claim 1, wherein the first connection pattern is disposed so as not to overlap the receiving electrode patterns of the other group, which are disposed between two receiving electrode patterns connected by the first connection pattern.

12. The touch input device of claim 1, wherein each of the receiving electrode patterns comprises a dummy pattern disposed in an opening defined therein.

13. A touch input device comprising:

a display panel having a plurality of scan lines;

a touch sensor comprising a plurality of driving electrodes arranged in the same direction as the scan line and a plurality of receiving electrodes arranged in a direction different from the scan line; and a control unit configured to perform a touch scan so that driving signals are applied to two or more driving electrodes of the plurality of driving electrodes, wherein the control unit controls a driving timing of the touch scan so that the scan line to which a display scan signal is applied of the plurality of scan lines and the driving electrodes to which the driving signals are applied are not in overlap with each other in terms of time and space, wherein each of the plurality of receiving electrodes comprises a first receiving electrode through which a first sensing signal is output and a second receiving electrode through which a second sensing signal is output, wherein the first receiving electrode is disposed directly adjacent to some driving electrodes of the plurality of driving electrodes and is disposed not to be directly adjacent to remaining driving electrodes, and wherein the second receiving electrode is disposed directly adjacent to the remaining driving electrodes and is disposed not to be directly adjacent to the some driving electrodes.

14. A touch input device comprising:

a display panel having a plurality of scan lines;

a touch sensor comprising a plurality of driving electrodes arranged in the same direction as the scan line and a plurality of receiving electrodes arranged in a direction different from the scan line; and a control unit configured to perform a touch scan so that driving signals are applied to two or more driving electrodes of the plurality of driving electrodes, wherein the control unit controls a driving timing of the touch scan so that the scan line to which a display scan signal is applied of the plurality of scan lines and the driving electrodes to which the driving signals are applied are not in overlap with each other in terms of time and space, wherein each of the plurality of driving electrodes comprises a first driving electrode to which a first driving signal is applied and a second driving electrode to which a second driving signal is applied, wherein the first driving electrode is disposed directly adjacent to some receiving electrodes of the plurality of receiving electrodes and is disposed not to be directly adjacent to remaining receiving electrodes, wherein the second driving electrode is disposed directly adjacent to the remaining receiving electrodes and is disposed not to be directly adjacent to the some receiving electrodes, and wherein the second driving signal is obtained by shifting the first driving signal by 180°.

15. The touch input device of claim 14, wherein each of the plurality of receiving electrodes comprises a first receiving electrode through which a first sensing signal is output and a second receiving electrode through which a second sensing signal is output, wherein the first receiving electrode is disposed directly adjacent to some driving electrodes of the plurality of driving electrodes and is disposed not to be directly adjacent to remaining driving electrodes, and wherein the second receiving electrode is disposed directly adjacent to the remaining driving electrodes and is disposed not to be directly adjacent to the some driving electrodes.

16. A touch input device comprising:

a display panel having a plurality of scan lines;

a touch sensor comprising a plurality of driving electrodes arranged in the same direction as the scan line and a plurality of receiving electrodes arranged in a direction different from the scan line;

a control unit configured to perform a touch scan so that driving signals are applied to two or more driving electrodes of the plurality of driving electrodes, a plurality of other driving electrodes disposed adjacent to the plurality of driving electrodes, respectively; and a plurality of other receiving electrodes disposed adjacent to the plurality of receiving electrodes, respectively, wherein the control unit controls a driving timing of the touch scan so that the scan line to which a display scan signal is applied of the plurality of scan lines and the driving electrodes to which the driving signals are applied are not in overlap with each other in terms of time and space, and wherein one ends of the other driving electrodes are electrically connected to each other, and one ends of the other receiving electrodes are electrically connected to each other.

17. The touch input device of claim 16, wherein each of the plurality of receiving electrodes comprises a first receiving electrode through which a first sensing signal is output and a second receiving electrode through which a second sensing signal is output, wherein the first receiving electrode is disposed directly adjacent to some driving electrodes of the plurality of driving electrodes and is disposed not to be directly adjacent to remaining driving electrodes, and wherein the second receiving electrode is disposed directly adjacent to the remaining driving electrodes and is disposed not to be directly adjacent to the some driving electrodes.

18. The touch input device of claim 16, wherein each of the plurality of driving electrodes comprises a first driving electrode to which a first driving signal is applied and a second driving electrode to which a second driving signal is applied, wherein the first driving electrode is disposed directly adjacent to some receiving electrodes of the plurality of receiving electrodes and is disposed not to be directly adjacent to remaining receiving electrodes, wherein the second driving electrode is disposed directly adjacent to the remaining receiving electrodes and is disposed not to be directly adjacent to the some receiving electrodes, and wherein the second driving signal is obtained by shifting the first driving signal by 180°.

19. The touch input device of claim 18, wherein each of the plurality of receiving electrodes comprises a first receiving electrode through which a first sensing signal is output and a second receiving electrode through which a second sensing signal is output, wherein the first receiving electrode is disposed directly adjacent to some driving electrodes of the plurality of driving electrodes and is disposed not to be directly adjacent to remaining driving electrodes, and wherein the second receiving electrode is disposed directly adjacent to the remaining driving electrodes and is disposed not to be directly adjacent to the some driving electrodes.

* * * * *